US008544731B2

(12) United States Patent
Elgar et al.

(10) Patent No.: US 8,544,731 B2
(45) Date of Patent: Oct. 1, 2013

(54) APPARATUS AND METHOD FOR PRODUCTION OF TRANSACTION CARDS

(75) Inventors: Adam Elgar, London (GB); Tom Elgar, London (GB)

(73) Assignee: Serverside Group Limited, London (GB)

( * ) Notice: Subject to any disclaimer, the term of this patent is extended or adjusted under 35 U.S.C. 154(b) by 1740 days.

(21) Appl. No.: 10/589,921

(22) PCT Filed: Aug. 17, 2004

(86) PCT No.: PCT/GB2004/003537
§ 371 (c)(1),
(2), (4) Date: Dec. 4, 2006

(87) PCT Pub. No.: WO2005/081128
PCT Pub. Date: Sep. 1, 2005

(65) Prior Publication Data
US 2007/0246526 A1    Oct. 25, 2007

(30) Foreign Application Priority Data

Feb. 17, 2004   (WO) ................ PCT/GB2004/000626
Mar. 29, 2004   (GB) .................................... 0407042.1

(51) Int. Cl.
*G06K 5/00*     (2006.01)
*G06F 17/00*    (2006.01)

(52) U.S. Cl.
USPC ......................................... 235/380; 235/375

(58) Field of Classification Search
USPC .......................................... 235/375–380, 454
See application file for complete search history.

(56) References Cited

U.S. PATENT DOCUMENTS 4,562,342 A * 12/1985 Solo .............................. 235/380
4,868,376 A *  9/1989 Lessin et al. .................. 235/492

(Continued)

FOREIGN PATENT DOCUMENTS

DE     10055649 A1   5/2002
EP      0412520 A2   2/1991

(Continued)

OTHER PUBLICATIONS

Claessens et al. "On the Security of Today's Online Electronic Banking Systems", Computers and Security (2002) pp. 257-269, vol. 21, No.3.

(Continued)

*Primary Examiner* — Jamara Franklin
(74) *Attorney, Agent, or Firm* — McDermott Will & Emery LLP

(57) ABSTRACT

A method for producing transaction cards corresponding to an account of a customer and bearing an image defined by the customer comprises associating an optically-readable identifier with a customer-defined image to be applied to the transaction card. The optical identifier can be read to reconcile it with a corresponding identifier related to customer account information to be applied to the transaction card. In this way a card may be produced bearing the image defined by the customer and the customer's account information.

46 Claims, 20 Drawing Sheets

(56) References Cited

U.S. PATENT DOCUMENTS

| | | | |
|---|---|---|---|
| 5,410,642 | A | 4/1995 | Hakamatsuka et al. |
| 5,771,071 | A | 6/1998 | Bradley et al. |
| 5,886,334 | A | 3/1999 | D'Entremont et al. |
| 5,889,941 | A | 3/1999 | Tushie et al. |
| 5,909,673 | A | 6/1999 | Gregory |
| 6,167,382 | A | 12/2000 | Sparks et al. |
| 6,328,209 | B1 * | 12/2001 | O'Boyle ............ 235/380 |
| 6,344,853 | B1 | 2/2002 | Knight |
| 6,493,677 | B1 | 12/2002 | von Rosen et al. |
| 6,827,277 | B2 * | 12/2004 | Bloomberg et al. ...... 235/491 |
| 6,842,533 | B1 * | 1/2005 | Patton et al. .......... 382/115 |
| 6,845,365 | B2 | 1/2005 | von Rosen et al. |
| 6,968,335 | B2 | 11/2005 | Bayliss et al. |
| 7,016,869 | B1 | 3/2006 | Haeberli |
| 7,103,230 | B1 | 9/2006 | Jam et al. |
| 7,360,692 | B2 | 4/2008 | Zellner et al. |
| 7,576,752 | B1 | 8/2009 | Benson et al. |
| 2001/0051876 | A1 | 12/2001 | Seigel et al. |
| 2002/0025085 | A1 | 2/2002 | Gustafson et al. |
| 2002/0057454 | A1 | 5/2002 | Ueda et al. |
| 2002/0059278 | A1 | 5/2002 | Bailey et al. |
| 2002/0062264 | A1 | 5/2002 | Knight |
| 2002/0067500 | A1 | 6/2002 | Yokomizo et al. |
| 2002/0078146 | A1 | 6/2002 | Rhoads |
| 2002/0152166 | A1 | 10/2002 | Dutta et al. |
| 2002/0175931 | A1 | 11/2002 | Holtz et al. |
| 2003/0069809 | A1 | 4/2003 | von Rosen et al. |
| 2004/0093527 | A1 | 5/2004 | Pering et al. |
| 2004/0099730 | A1 | 5/2004 | Tuchler et al. |
| 2004/0144472 | A1 | 7/2004 | Cowie |
| 2004/0160624 | A1 | 8/2004 | Elgar et al. |
| 2004/0254833 | A1 | 12/2004 | Algiene |
| 2005/0167487 | A1 | 8/2005 | Conlon et al. |
| 2006/0200533 | A1 | 9/2006 | Holenstein et al. |
| 2007/0075134 | A1 | 4/2007 | Perlow et al. |
| 2007/0102510 | A1 | 5/2007 | Beemer et al. |
| 2007/0156837 | A1 | 7/2007 | Elgar et al. |
| 2007/0185795 | A1 | 8/2007 | Petrime et al. |
| 2007/0215699 | A1 | 9/2007 | Arego et al. |
| 2007/0219809 | A1 | 9/2007 | Peyton |
| 2007/0267486 | A1 * | 11/2007 | Ferrara et al. ............ 235/380 |
| 2008/0230616 | A1 | 9/2008 | Elgar et al. |
| 2008/0308636 | A1 | 12/2008 | Lynch et al. |
| 2009/0052736 | A1 | 2/2009 | Kacker |

FOREIGN PATENT DOCUMENTS

| | | |
|---|---|---|
| EP | 0860986 A2 | 8/1998 |
| EP | 0878956 A1 | 11/1998 |
| EP | 1602072 | 12/2005 |
| EP | 1 847 964 A2 | 10/2007 |
| JP | 2000-190669 | 7/2000 |
| KR | 2002-0033704 A | 5/2002 |
| WO | WO 98/04988 | 2/1998 |
| WO | WO 01/77858 A2 | 10/2001 |
| WO | WO 02/39329 A2 | 5/2002 |
| WO | WO 02/067528 A2 | 8/2002 |
| WO | WO 03/085573 | 10/2003 |
| WO | WO 2004/074961 A2 | 9/2004 |
| WO | WO 2005/081128 A1 | 9/2005 |
| WO | WO 2006/018624 A1 | 2/2006 |
| WO | WO 2006/018636 A2 | 2/2006 |
| WO | WO2006018624 | 2/2006 |

OTHER PUBLICATIONS

Perfetti et al., "Macromedia Flash: A New Hope for Web Applications", User Interface Engineering, White Paper, (2002) pp. 1-17.
"*Macromedia: Entwicklung von rich-Internet-Anwedungen mit Macromedia MX*", Macromedia White Paper, Apr. 2002.
Dahm, "Search Engine Tip: Beware of Query Strings" Keynote NetMechanic, Webmaster Tips, vol. 2, No. 11, Dec. 1999, http://www.netmechanic.com/news/vol2/search_no11.htm.
Thomason, "Beginner Tip: Form Processing Basics" Keynote NetMechanic, Webmaster Tips, vol. 5, No. 19, Oct. 2002, http://www.netmechanic.com/news/vol5/beginner_no19.htm.
Sheriff, "*Introduction to ASP.NET and Web Forms*", msdn, .NET Development (General) Technical Articles, Nov. 2001, http://msdn.microsoft.com/en-us/library/ms973868(printer).aspx.
Kochhar, "InformIT: Posting HTML Form Data as XML Strings> Why XML?", informIT, Jun. 29, 2001, http://www.informit.com/articles/article.aspx?p=21906.
Kochhar, "Peachpit: Transforming HTML Form Data as XML Strings Using Java>A Refresher", Oct. 12, 2001, http://www.peachpit.com/articles/articles.aspx?p=23607.
"FLASH-> ASP-> MS-Access: Please Help", Microsoft IIS Web Server and ASP.NET, Webmaster World.com, Jan. 25-31, 2002, http://www.webmasterworld.com/forum47/45.htm.
"Macromedia Fireworks 4—Using Fireworks and Flash Together: Importing PNG files with transparency", Adobe Systems Incorporated (2008) http://www.adobe.com/support/fireworks/programs/fw_to_flash/fw_to_flash05.html.
"Transparency Support in Flash" Adobe Systems Incorporated (2008) http://kb.adobe.com/selfservice/viewContent.do?externalId?tn_12804.
Gleason, "An Overview of the File Transfer Protocol" NcFIP Software (2001) http://www.ncftp.com/libncftp/doc/ftp_overview.html.
Vuong, "Home PC surfers accelerate use of high-speed connections", The Denver Post, Feb. 9, 2001.
Mitchell, "History of Networking—About Computer Networking History" About.com, printed May 15, 2008, http://compnetworking.about.com/od/basicnetworkingconcepts/l/aa021403a.htm.
"Global Napster Usage Plummets, But New File Sharing Alternatives Gaining Ground, Reports Jupiter Media Metrix", Jupiter Media Metrix, Jul. 20, 2001, http://www.comscore.com/press/release.asp?id=249.
Affidavit of Tom Elgar in the Matter of the Opposition to the Grant of Indian Patent No. 230390, May 9, 2010.
Affidavit of Tom Elgar in the Matter of the Opposition to the Grant of Indian Patent No. 230390, Aug. 31, 2010.
Opposition Under Section 25(2) of the Indian Patent Act, 1970 Against Indian Patent No. 230390 (Formerly Application No. 3046/CHENP/2005 dated Nov. 17, 2005), Preliminary Submissions, Dr. Steve G. Belovich, Mar. 23, 2010.
Reply Evidence Under Rule 59 of the Indian Patent Rules, 2003 in the Opposition filed by Dimpledough Inc. against Indian Patent No. 230390, Jul. 30, 2010.

\* cited by examiner

US 8,544,731 B2

APPARATUS AND METHOD FOR PRODUCTION OF TRANSACTION CARDS

CROSS-REFERENCE TO RELATED APPLICATIONS

This application claims the benefit of PCT Application Serial Number PCT/GB2004/000626, filed Feb. 17, 2004, entitled "Method and Apparatus for Manipulating Images"; and of GB Application Serial Number 0407042.1, filed Mar. 29, 2004, entitled "Secure Production Facility." The disclosures of both of these related applications are hereby incorporated herein by reference.

TECHNICAL FIELD

This invention relates to a method and apparatus for producing transaction cards; and in particular to a method and apparatus for producing transaction cards having a personalized appearance.

BACKGROUND

There is an increasing trend towards personalizing the appearance of mass-marketed consumer items, as seen, for example, in the use of customized designs and ring-tones for mobile phones.

Prior to the present invention, however, financial account access means such as credit cards have remained un-personalized in appearance; perhaps due to anticipated difficulties in allowing a user to personalize the appearance of an item such as a credit card while also maintaining appropriate security for the user's private financial information.

SUMMARY

According to an aspect of the present invention there is provided a method of producing a transaction card corresponding to an account of a customer and bearing an image defined by said customer, comprising the step of associating an optically-readable identifier with a customer-defined image.

According to another aspect of the present invention, there is provided a method for producing a transaction card corresponding to an account of a customer and bearing an image defined by said customer, the method comprising:
associating an optically readable identifier with a customer-defined image to be applied to a transaction card;
reading said optical identifier to reconcile it with a corresponding identifier related to customer account information to be applied to the transaction card; and
producing a transaction card bearing said customer-defined image and said customer account information.

In preferred embodiments, the optically readable identifier (optical identifier) is associated with the image by a card graphics hosting service accessible to customers via the internet. In order to produce a finished card, the optical identifier associated with the image is read as part of the card production process and a version of the identifier is encoded into the magnetic strip of the card, which magnetic version of the identifier can be used by legacy production equipment to ensure the correct account information (for example embossing record) is applied to the card. These steps in the production process may occur anywhere with suitable equipment and may occur on a number of different sites according to preference and existence of legacy equipment on various sites.

BRIEF DESCRIPTION OF THE DRAWINGS

For a better understanding of the present invention, and to show how the same may be carried into effect, reference will now be made, by way of example only, to the accompanying drawings, in which.

DETAILED DESCRIPTION

In an embodiment according to the invention there is provided a method for producing a financial account access means, such as a credit card or other financial card, having a personalized appearance. Embodiments of the invention allow the production of such a financial account access means bearing a user-selected design, while also maintaining appropriate security for the user's private financial information; in a way that also can be integrated in an economic fashion into conventional card production techniques. Embodiments herein are relatively easy for a card issuer to implement, with few changes to current systems; and allow a cardholder to personalize their entire card, including even issuer logos and holograms.

Figure 1:
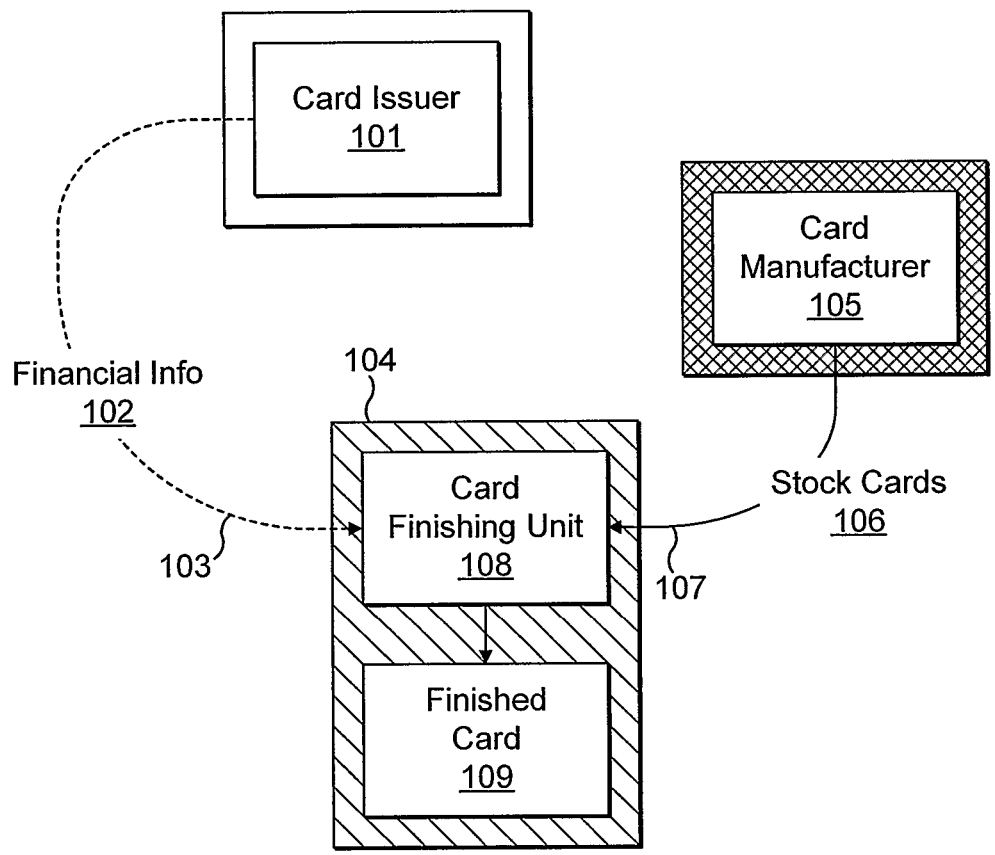
FIG. 1 is a block diagram of a typical prior art technique for producing a financial account access means, such as a credit card, which is not personalized in appearance.

FIG. 1 is a block diagram of a typical prior art technique for producing a financial account access means, such as a credit card, which is not personalized in appearance. A card issuer 101, such as a bank, transmits cardholders' financial information 102 over a secure network link 103 to a card personalization facility 104, which applies the cardholders' financial information to credit cards. The cardholders' financial information may include, for example, data such as each credit card holder's name, credit card number, card expiry date, etc.; which is to be embossed and, for some data, magnetically imprinted on a credit card. A card manufacturer 105 prints the stock credit cards 106 to which the cardholders' financial information 102 will be applied, and securely passes 107 the stock cards to the finishing facility 104, for example, in a security van. At the card finishing facility 104, a card finishing unit 108, such as a Datacard 9000, embosses the cards, encodes their magnetic stripes, and optionally combines them with pre-addressed letters or envelopes for mailing. The result is a set of conventional finished cards 109 which are not personalized in appearance. It should be noted that the term "card personalization unit," as used in the prior art, referred to the finishing unit 108 for applying each cardholder's financial information to a card, and not to a unit that personalized the cards' appearance according to each cardholder's preference.

Figure 2:
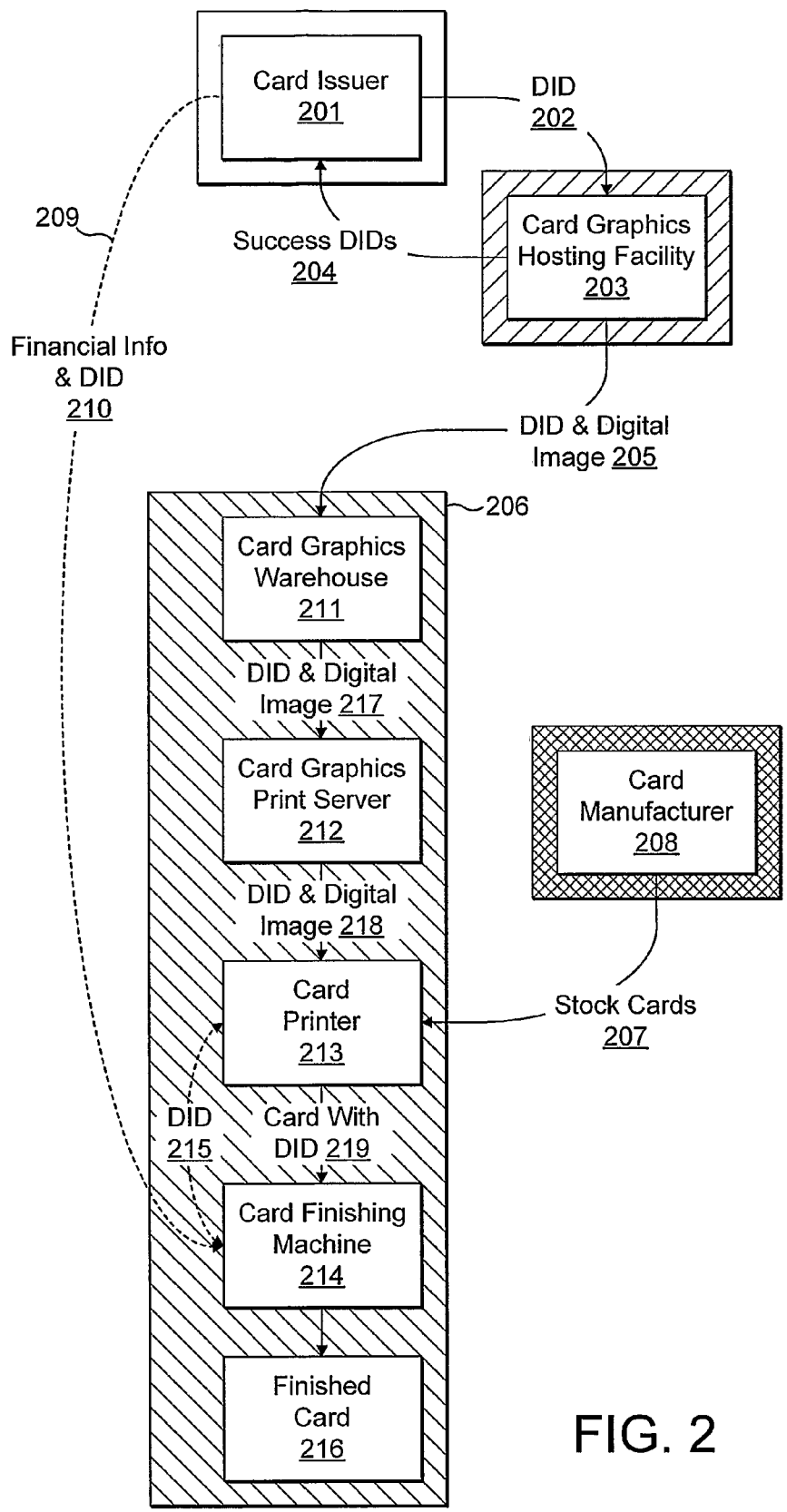
FIG. 2 is a block diagram of a technique for producing a financial account access means that is personalized in appearance, according to an embodiment of the invention.

FIG. 2 is a block diagram of a technique for producing a financial account access means that is personalized in appearance, according to an embodiment of the invention. In common with other embodiments herein, the security of financial information is guaranteed by having all cardholder financial information pass down a secure network 209; thus, no financial information passes to the card graphics hosting facility 203. The cardholder graphics hosting facility is passed a card design identifier 202 that is unique to the cardholder, but it cannot be traced back to the cardholder by a third party; thus security is further guaranteed.

However, as will be seen below, the embodiment of FIG. 2 suffers from drawbacks, in some respects, compared with later embodiments herein, in that it is more difficult to integrate with conventional card production techniques. In the embodiment of FIG. 2, a card issuer 201 passes a unique, non-sequential digital identifier 202 for each cardholder who will be personalizing their card's appearance, to a card graphics hosting facility 203. The digital identifier 202 has no significance other than as a tie between the image to be created and the individual that is designing the card. The card graphics hosting facility 203 may, for example, include a website server, with which the cardholder interacts to design a card. Once the card design is complete, the card graphics hosting facility 203 passes back 204 to the card issuer 201, a digital identifier for each cardholder who has successfully designed a card, as confirmation that the card's design has been successfully completed. The card graphics hosting facility 203 passes 205 each cardholder's digital identifier, and the associated card design digital image for that cardholder, to a card finishing facility 206. The card finishing facility 206 also receives stock credit cards 207 from a card manufacturer 208; and, over a secure network link 209, the financial information 210 of each cardholder along with the digital identifier that was given 202 to the card graphics hosting facility for identifying each cardholder's card design.

Using the financial information and digital identifiers 210; the digital images and associated digital identifiers 205; and the stock cards 207; the card finishing facility 206 of the embodiment of FIG. 2 creates a credit card that is personalized in appearance. The card design digital images and associated cardholder digital identifiers are stored in a card graphics warehouse 211, and passed 217 to a card graphics print server 212. The print server 212 acts as a server for a card printer 213, which may be, for example, an Artista card printer. The card printer 213 prints onto a stock card 207 by pulling 218 an image and associated digital identifier from the print server 212; and also encodes the card's magnetic stripe with the card design digital identifier. The card with magnetic digital identifier is then passed 219 to a card finishing 214, such as a Datacard 9000, which reads the magnetic stripe on the back of the card, and uses the digital identifier to obtain the appropriate financial information 210 for embossing the card and preparing it for mailing. The card finishing machine 214 may, upon obtaining the financial information and associated digital identifier 210, pass the digital identifier 215 to the card printer to signal which card design should be produced next. Also, the card finishing machine 214 (in this and other embodiments) may include a bar-code reader or other optical reader, in addition to, or instead of, a magnetic stripe reader. The result of the process is a finished card 216 with a cardholder's financial information and own personalized design.

There are a number of potential drawbacks to the embodiment of FIG. 2. As can be seen by comparing the card finishing facility 206 of FIG. 2 with the card finishing facility 104 of the conventional card production technique in FIG. 1, the embodiment of FIG. 2 requires much extra equipment and processing at the card finishing facility. An extra card printer 213, which can cost as much as U.S. $250,000, must be present at every card finishing facility. Since some card finishing facilities run only small numbers of cards, the requirement of an extra card printer at each facility adds expense to card production. The card printer has a high consumable cost per card (e.g. U.S. $0.25 per card). Also, the use of extra print equipment at each card finishing facility requires extra staff training. In addition, there are registration and alignment issues between the image that the card printer 213 lays down, and elements already present on the stock card 207, such as a hologram and some logos. From a data point of view, the card graphics hosting facility 203 needs to transfer images to each of potentially many card finishing facilities 206, which is difficult and costly to do reliably and securely. And because the images required for printing are called locally, each card finishing facility 206 must have equipment for storing the images locally. Also, a card printer 213 that can be used at a card finishing facility, such as an Artista printer, cannot print gold, ultraviolet ink, or Pantone-compliant colors; and cannot print at a sufficient quality to lay down card association marks. Finally, re-issue of a card, in the event that it is lost, may be difficult for a card issuer; cardholders' preferred card images would have to be warehoused, and pulled for re-issue, on one system; while also combining the re-issued images with new cards to be printed on a given day.

Figure 3:
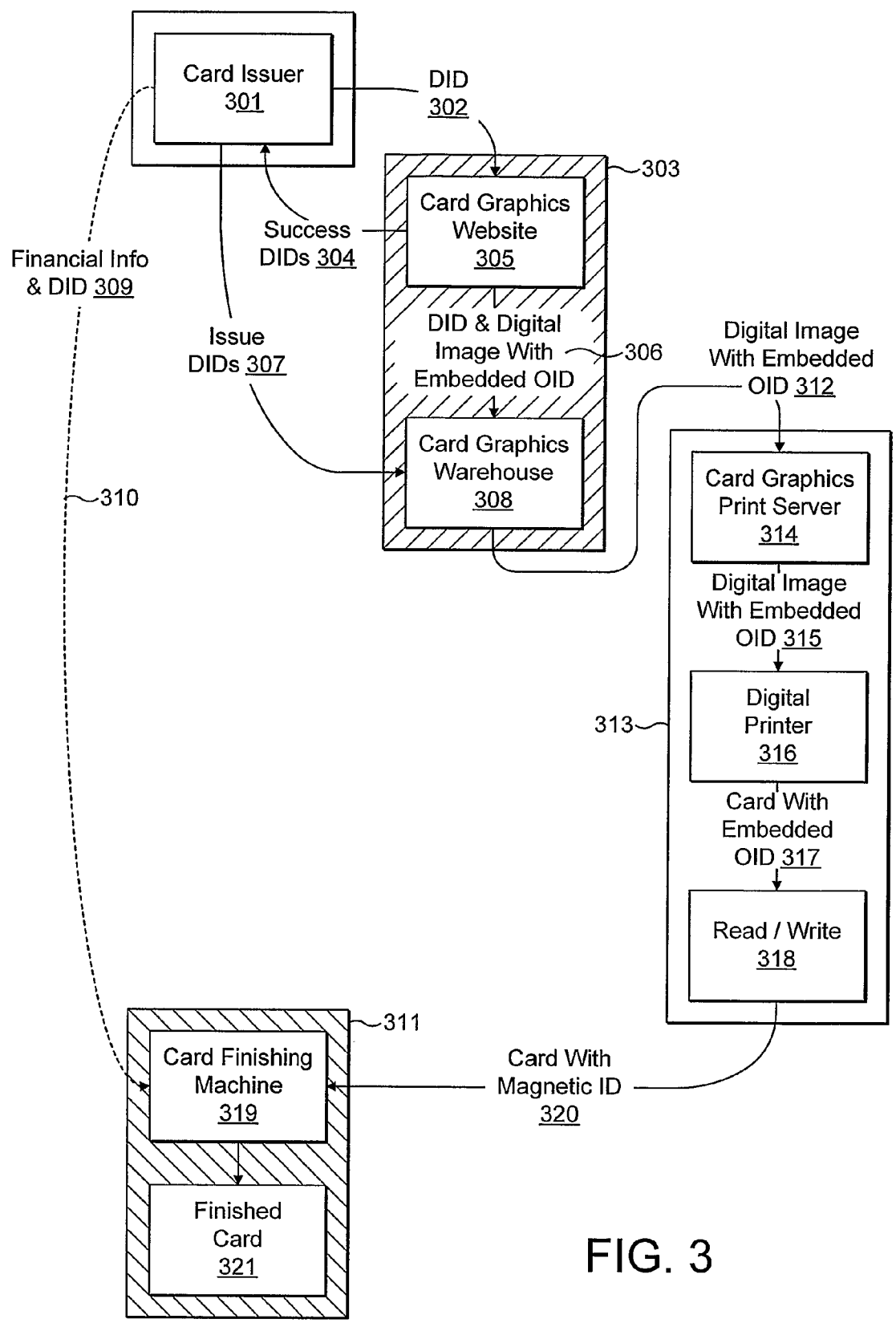
FIG. 3 is a block diagram of a technique for producing a financial account access means that is personalized in appearance, using a card printer located at a card manufacturer's facility, according to an embodiment of the invention.

These potential drawbacks with the embodiment of FIG. 2 are addressed by the embodiment of FIG. 3, which makes possible personalization of card designs at a card manufacturer's facility, in a secure fashion. In the embodiment of FIG. 3, a card issuer 301 passes a unique, non-sequential digital identifier 302, for each cardholder who will be personalizing their card's appearance, to a card graphics hosting facility 303, in a similar fashion to that of the embodiment of FIG. 2. The digital identifier is passed back 304 to the card issuer 301 as confirmation that a design has been successfully completed, for example by a user interacting with a card graphics website 305. The card issuer 301 passes back to the personal graphics hosting facility 303 the digital identifiers 307 of cardholders who have completed their card design, and who have been credit approved. The card issuer 301 can add to the file 307 the digital identifiers of any cards that need re-issuing due to loss, expiry, or other factors. The card issuer 301 also associates the successful digital identifiers 307 with cardholders' financial information 309, and passes them via a secure network link 310 to a card finishing facility 311. The card graphics hosting facility 303 associates 306 each cardholder's digital identifier with the cardholder's completed card design digital image, and stores them in a card graphics warehouse module 308 which may be a near-line image storage facility. In one embodiment, the card graphics hosting facility 303 associates 306 the digital identifier with its corresponding image by converting the digital identifier into an optical format, using, for example, a barcode, text, microdot, microtext, invisible ink, or other technique; and embedding the optical-format identifier as part of the digital image to be applied to the card; for example by printing the optical identifier into the image itself. The digital identifier may also be printed in two or more different optical formats, or multiple times in the same format, so that the identifier can be read in the event of a mis-scan.

The embodiment of FIG. 3 next uses the list of credit-approved digital identifiers 307 to pull the relevant images from the card graphics warehouse 308; and passes the digital images with embedded optical identifiers 312 to a card graphics print server 314 at a card manufacturer 313. The card graphics print server 314 may be, for example, an offline short-term image storage facility, designed to optimize images for the associated printer. Because the digital identifiers have been embedded optically in the digital images, only the images 312 need to be passed to the card manufacturer 313, without a need for the digital identifiers to be transmitted separately. The digital image with embedded optical identifier 315 can then be passed to a digital printer 316, which simply prints all of the cards whose images are passed to it by the print server 314. The digital printer 316 may be, for example, an HP Indigo printer, or similar system. More generally, it may be a high quality commercial digital press designed to digitally print financial cards. For example, the printer 316 may be a machine that is Pantone-compliant and prints at over 800 dpi; that can lay down logos, brand marks, optical identifiers, and card designs in a single process, both rapidly and economically; and that can also print every card, of a sheet of cards, with different information. Preferably, the printer 316 may print a variety of colors, all in ink; including at least four visible colors and two others (one ultraviolet and another metallic, fluorescent, or similar). Next, the printed card 317 with embedded optical identifier in its printed image is passed to a read/write module 318, which reads the optical identifier of each card and encodes it into the card's magnetic stripe, thereby making the digital identifier of each card magnetically readable by a card finishing machine 319. The cards with magnetic identifiers 320 are shipped through the conventional channels from the card manufacturer 313 to the card finishing facility 311. A card finishing machine 319 (such as a Datacard 9000 or other machine), can then read each card's magnetic identifier and use it to associate the correct image-printed card with the associated cardholder's financial information, as provided over link 310. A finished card 321 can then be produced, which has a user's financial information as well as a personalized appearance.

There are a number of advantages to the embodiment of FIG. 3. First, there is no additional equipment required at each card finishing facility 311; the equipment is the same as that required at each card finishing facility 104 by the conventional card production technique of the embodiment of FIG. 1. Next, digital images are passed in large volume to a small number of card manufacturers 313, and between two components 305 and 308 of the card graphics hosting facility 303; instead of being passed to a potentially large number of card finishing facilities 311, as in the embodiment of FIG. 2. This means that a fast, dedicated line for transmitting digital images 306 and 312 may be put in place. Also, because the digital identifiers are optically embedded in the digital images 312, there is no need to send the digital identifiers separately to the card manufacturer 313. This means that only one file type (the digital image file type) needs to be passed to the card manufacturer 313, in one direction; thus, the dedicated line for transmitting data 312 can be easily locked down in a firewall. In addition, the process of FIG. 3 makes it easier for a card issuer 301 to request that a card be re-issued; the card issuer 301 simply sends the digital identifier of the card to be re-issued in the same list 307 of digital identifiers that is sent 309 to the card finishing facility 311. On the printing side, the embodiment of FIG. 3 uses a single printing process of a digital printer 316 to allow elements such as card logos and the personalized images to be printed right up against each other, without suffering alignment and registration problems. The increase in print cost, by comparison with the embodiment of FIG. 2, is very low; and the print quality is high (for example, digital printer 316 may print at 800 dpi, instead of the 300 dpi achieved by card printer 213). The processes of each entity are also streamlined: neither the card issuer 301 nor the card finishing facility 311 needs to deal with cumbersome digital images; the processes at the card finishing facility 311 are entirely in-line; and there is little change to the process at the card manufacturer's facility 313.

Figure 4:
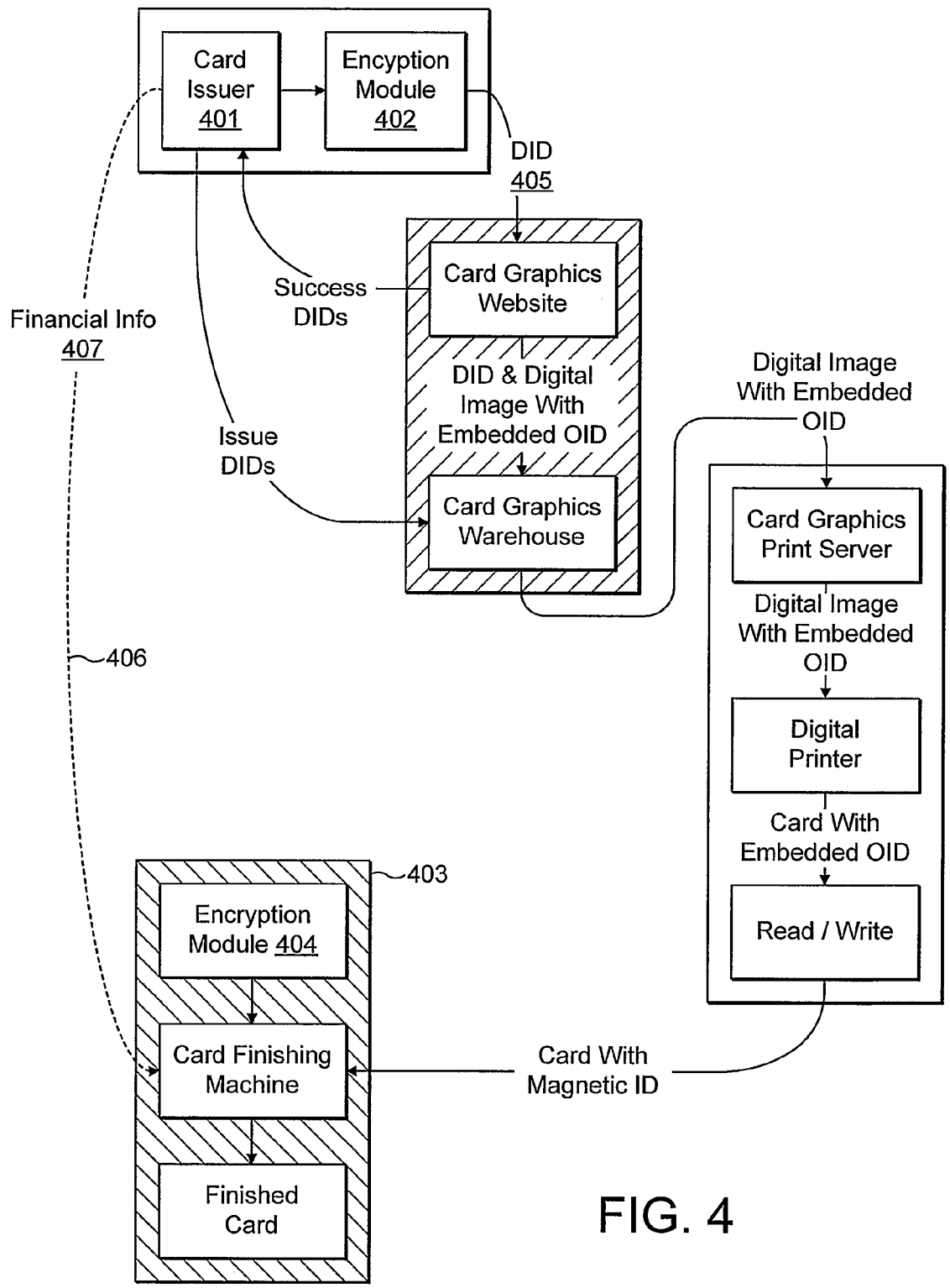
FIG. 4 is a block diagram of a technique for producing a financial account access means that is personalized in appearance, in which encryption modules are located at a card issuer and a card personalization facility, according to an embodiment of the invention.

The embodiment of FIG. 4 is similar to that of FIG. 3, with some modifications that may be useful to card issuers. In particular, the embodiment of FIG. 4 differs by including an encryption module 402 in the card issuer 401's system, and an encryption module 404 at the card finishing facility 403. The encryption module 402 is used to apply an encryption function to some of the unique financial information, personal to each cardholder, in order to produce the digital identifier 405 that will be used to identify the cardholder's card design. The encryption may be performed using a one-way encryption function, such as an MD5 hash function or other hash function, which encodes the cardholder information in a non-reversible fashion. Because the encryption function is used to produce the digital identifier 405, there is no need for the card issuer to pass a digital identifier over secure network link 406, along with the cardholders' financial information 407. Instead, an encryption module 404 can be used at the card finishing facility 403 to apply the same encryption function to the same portion of the cardholder's financial information 407, as was applied by encryption module 402. The output of encryption module 404 is therefore the same digital identifier 405 for the cardholder as was produced by encryption module 402 in order to reconcile a cardholder's card design with their financial information. By contrast with the embodiment of FIG. 3, however, there is no need for the card issuer 401 to pass a digital identifier along with the financial information 407 over network 406. This means that the card issuer 401's systems for sending financial information 407 do not need to be modified (by comparison with their conventional transmissions 102 of FIG. 1), which may be of advantage to the card issuer by comparison with the embodiment of FIG. 3.

Figure 5:
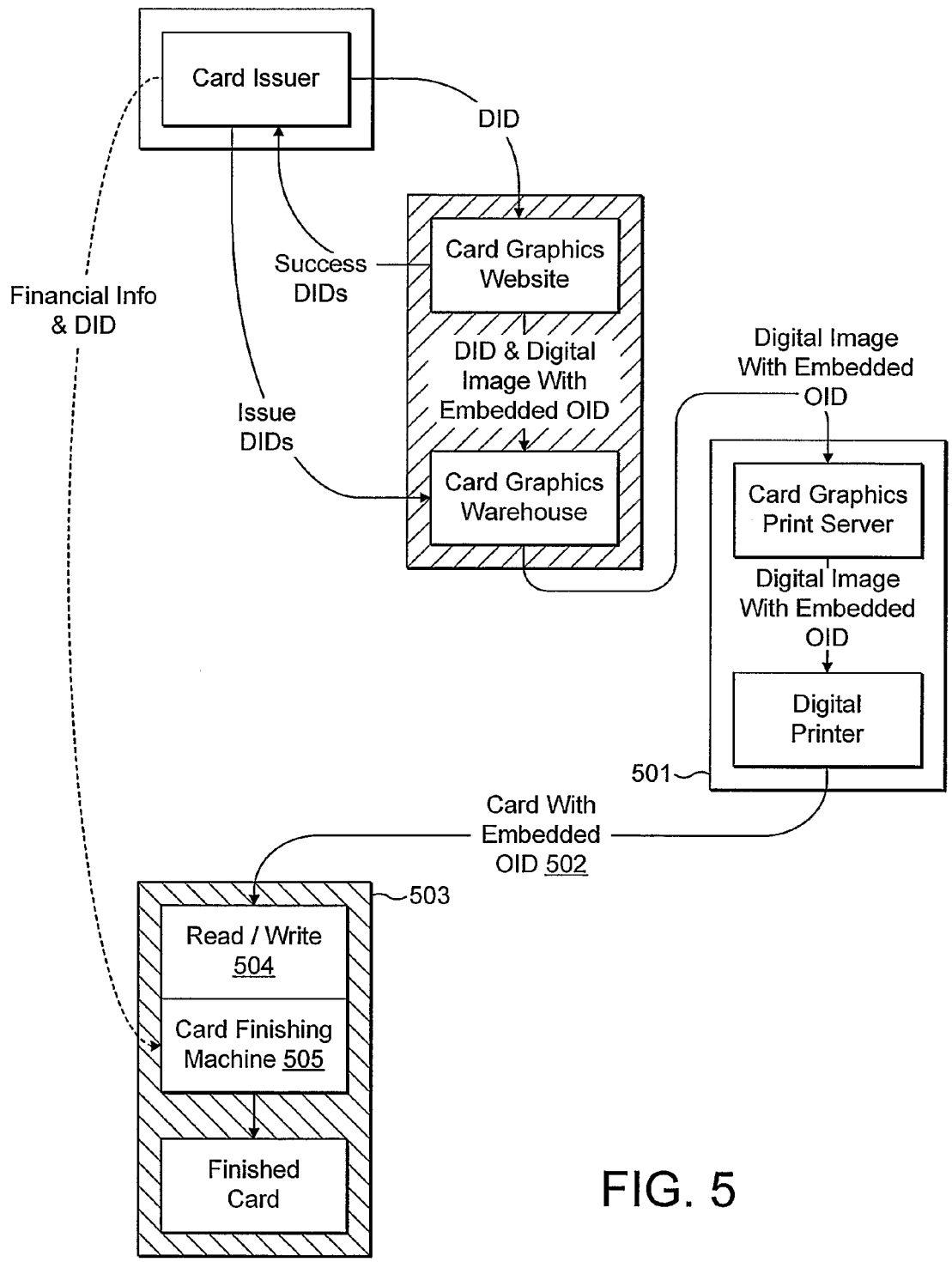
FIG. 5 is a block diagram of a technique for producing a financial account access means that is personalized in appearance, in which a read/write module is located at a card personalization facility, according to an embodiment of the invention.

In a further embodiment according to the invention, shown in FIG. 5, the embodiment of FIG. 3 is modified by moving the read/write module 318 from the card manufacturer 313 to the card finishing facility 311. As shown in FIG. 5, a card manufacturer 501 sends a printed card with embedded optical identifier 502 to the card finishing facility 503. A read/write module 504 then reads the optical identifier 502 and writes it to the card's magnetic stripe, so that it may be read by card finishing machine 505 in a similar fashion to that of finishing machine 319 of FIG. 3. By comparison with the embodiment of FIG. 3, the embodiment of FIG. 5 has the advantage that no additional equipment is required at the card manufacturer 501's facility. Also, processes at the card finishing facility 503 are still in-line. Potentially, however, the embodiment of FIG. 5 could have the drawback, by comparison with the embodiment of FIG. 3, that the size and type of optical identifier printed on card 502 depends on the read/write equipment 504 used at the card finishing facility 503. Because this equipment may be less sophisticated than a read/write module 318 used by a card manufacturer, there is the possibility that the optical identifiers 502 could need to be large or unsightly; possibly leading to the card being refused at point of sale.

Figure 6:
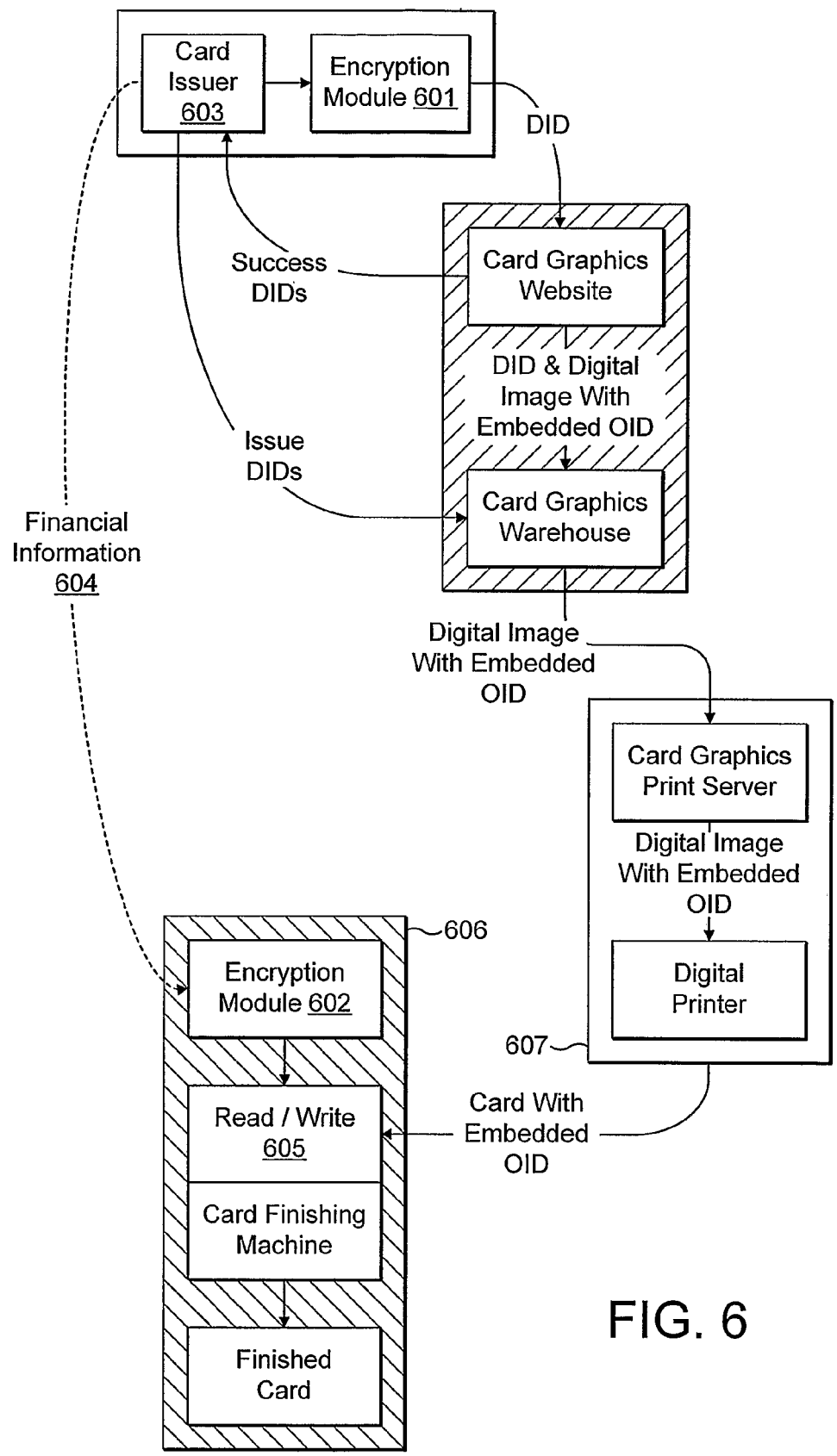
FIG. 6 is a block diagram of a technique for producing a financial account access means that is personalized in appearance, in which encryption modules are located at a card issuer and a card personalization facility, and in which a read/write module is located at a card personalization facility, according to an embodiment of the invention.

In another embodiment according to the invention, shown in FIG. 6, the modifications of the embodiments of FIGS. 4 and 5 are combined. Specifically, the embodiment of FIG. 6 uses a pair of encryption modules 601 and 602 to avoid the need for the card issuer 603 to send digital identifiers along with financial information 604 (in a similar fashion to the embodiment of FIG. 4). Also, in a similar fashion to the embodiment of FIG. 5, a read/write module 605 is moved to the card finishing facility 606, instead of being located at the card manufacturer 607. The embodiment of FIG. 6 therefore combines the advantages and disadvantages of FIGS. 4 and 5: no additional equipment is required at the card manufacturer 607; processes at the card finishing facility 606 are in-line; and no digital identifier needs to be transmitted along with financial information 604, so that card issuer 603's systems do not need to be adjusted to do so. However, as with FIG. 5, the use of read/write module 605 at the card finishing facility 606 may produce the possibility that the optical identifier could be large or unsightly, if the read/write module is of a less sophisticated kind than would be used by a card manufacturer.

Figure 7:
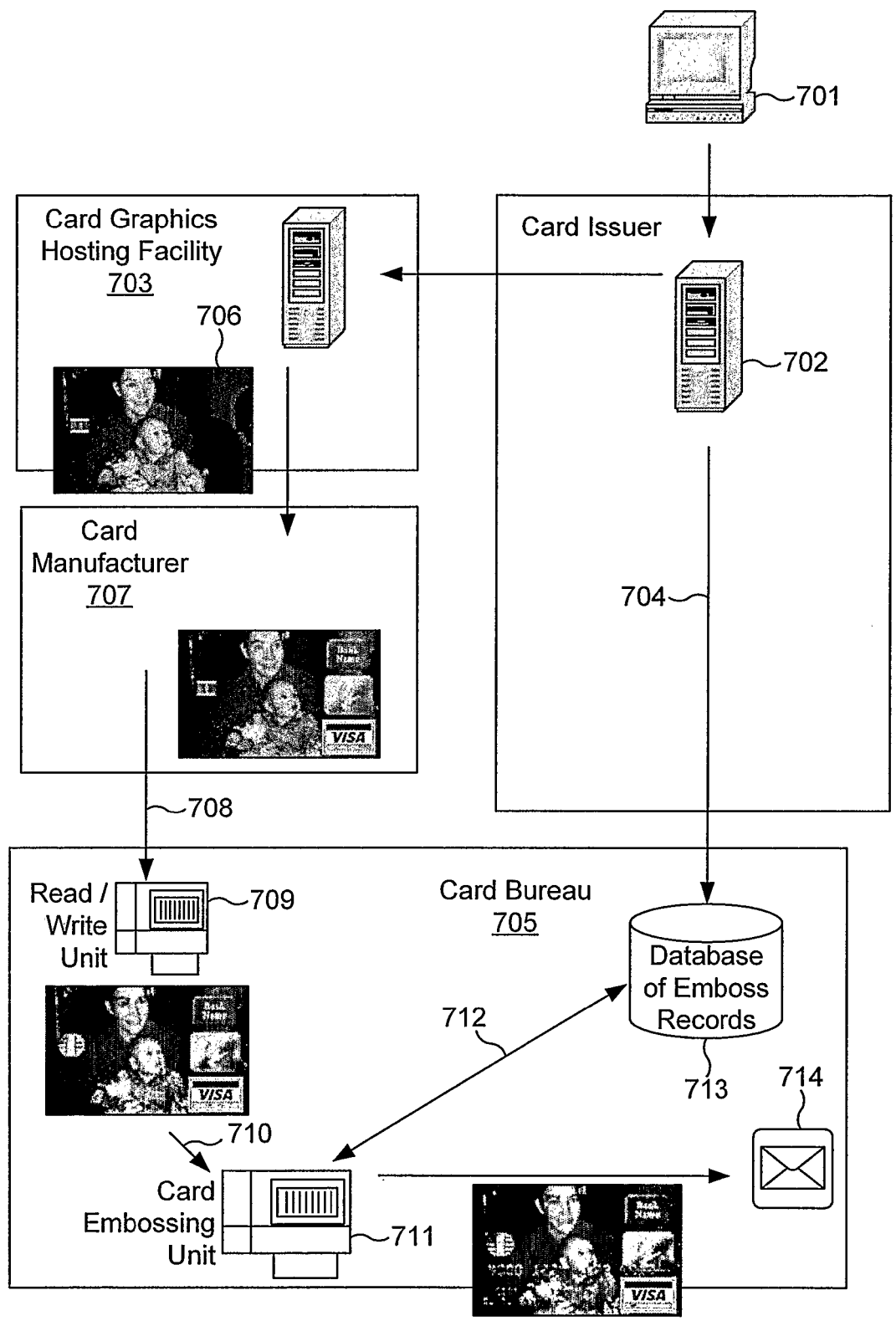
FIG. 7 is a block diagram of a technique for producing a financial account access means that is personalized in appearance, in which a unique identifier is positioned based on the location of an embedded chip in the financial account access means, according to an embodiment of the invention.

A further embodiment according to the invention, shown in FIG. 7, positions a barcode (or other unique identifier) based on the position of an embedded chip in the financial account access means. First, a user logs on 701 to an e-banking site, or otherwise makes application for a financial account access means. A card issuer server 702 receives the user's request to personalize their card, and passes a unique identifier, for associating the user with the personalized card design, to a card graphics hosting facility 703. The card issuer server 702 also passes 704 the user's financial (emboss) records to a card bureau 705, along with the unique identifier that was passed to the card graphics hosting facility. At the card graphics hosting facility 703, which may be implemented as a website, the user designs their card with reference to a graphical template indicating the embossing and logos which appear on a standard card for that card issuer; and the card graphics hosting facility 703 checks the user's card design for acceptability. Next, the embodiment of FIG. 7 takes advantage of the fact that the card will have an embedded chip positioned at location 706 on the card, by positioning a barcode, which will be used to identify the user associated with the card design, in the same position 706 as the chip will later be added. This allows use of a larger or more visible barcode, because the barcode will not be seen in the final card design once it is covered by the embedded chip. The card graphics hosting facility 703 then sends the user's final image with the user's unique identifier encoded in the barcode, to a card manufacturer 707. The card manufacturer 707 prints the card, using a card printer such as, for example, an HP Indigo Press. A barcode is included on the image printed onto the card, in the position that will be subsequently occupied by the embedded chip; and the card issuer logos, and logos of card associations such as Visa or Mastercard, are overlaid on the image. The card is then sent 708 to the card bureau 705, via standard secure delivery. At the card bureau 705, a read/write unit 709, such as a Datacard 5000 card reader, reads the barcode on the card, and writes the user's unique identifier to the card's magnetic stripe. The read/write unit 709 also grinds out the plastic on the card, and places an embedded chip in place of the barcode. The card is then placed 710 into a Datacard 9000, or similar card embossing unit 711; and the user's emboss record is requested 712 from a database of emboss records 713, using the user's unique identifier held in the card's magnetic stripe. The card embossing unit 711 then embosses and mails the card, to produce a finished card 714 in an envelope with the user's address.

Next, there will be described an embodiment according to the invention that allows a user to manipulate an image through a browser interface, and is divided into two software portions, here referred to as front end software and back end software. The front end software operates entirely within an Internet browser and in most cases does not require a download, because it accepts the limitations of the browser. In one embodiment, the front end software runs Flash software, available from Macromedia Inc. of 600 Townsend Street, San Francisco, Calif. 94103, U.S.A., or equivalent software. The front end software is a pure Graphical User Interface (GUI), and allows a user to design and edit graphics on his or her screen in order to build a representation of a desired image. Representations of stock (starting) images can be presented to a user in an on-screen image library and/or created by the user on demand. The image desired for output can be made up from one or several representative components, each of which has its position defined relative to an origin, and can be manipulated based on a set of predetermined rules—such as, for example, rules allowing the image or its components to be resized, rotated, flipped, mirrored and moved relative to other components. The representative graphical components can be used, for example, to build relatively complex designs consisting of a plurality of different layers and/or transparencies constructed using Flash scenes.

When the design is completed, in an embodiment according to the invention, instructions about what the final image looks like are sent to the back end software, which runs on a server. In the preferred embodiment, these instructions are sent together (simultaneously) after the manipulation is completed, and take the form of a text string for each component of the image. For example, the text string makeimage.aspx for a graphics component might read:

id+=030,  x=182,  y=32.3,  flip=yes,  rotate=270, scale=190.6, user=230 where id is an image identifier; x and y define the position of a component relative to a predetermined origin; flip, rotate, and scale define manipulations of types generally well known in the art; and user is a number identifying the user. Those of skill in the art will appreciate that a range of image manipulations can be defined in this way. A resulting image may be represented by one or a number of graphical components. It is thus possible for a plurality of text strings, or an extended text string, to define an image made of a plurality of separate graphical components. The graphical components used, for example, in Flash movie scenes are generated and manipulated with a minimum of computing resources; and the designs constructed as a result can be recreated on the back end (server) side using the relevant (and generally much larger) image files. Relatively complex designs can be achieved by employing two or more image components with separate image identifiers. The image identifiers for graphical components of the same image may have a common characteristic. In accordance with embodiments of the invention, the instructions included in the text string that defines the manipulations needed to create the resultant image, need not all be included in a single text string; instead, a series of text strings may be transmitted separately to convey the same plurality of instructions. Furthermore, manipulations on the remote server need not await receipt of all of the series of text strings, but can instead be performed in stages as each string of the series is received. Regardless of the number of text strings used, an advantage of an embodiment according to the invention is that a smaller, emulated version of the image can be manipulated by the user with a minimum of computing resources, and instructions can be transferred efficiently as text strings; instead of requiring the inefficient (and time-consuming) transfer of large image files, or portions thereof, between the customer and an image-production server. Further, the need to make calls to a server with an image change each time that a single manipulation is made, is also overcome.

The back end software is responsible for generating the final image, in accordance with an embodiment of the invention, by interpreting the manipulations applied to the representation (defined in the, or each, text string file) and applying corresponding manipulations to one or more stock images held in a remote image store. The images used in the front end software are less computationally-demanding representations of those held on the server. As a result, the back end software can make image transformations that exactly mirror those which are seen on the client machine. Once the desired image has been created by the back end software, the image can be output to whatever device is required, such as a device for printing the image onto a personalized consumer item. In this way, the graphical representation is displayed and manipulated at the user interface by means of the Flash software, and only a minimal amount of information concerning the image and manipulations applied thereto need be transferred to the remote image processor.

As mentioned above, the front end software may use Macromedia's Flash, or another product. For example, the software could instead use HTML and Javascript (DHTML) without a download, although the GUI is relatively poor. Use of Flash (or equivalent) software is advantageous in that it does not allow full access to a user's local files, so that it does not risk transmitting computer viruses to the user's machine. Use of Flash software also does not require a user to install software other than the Flash plug-in, which has a high penetration of the browser market.

An embodiment according to the invention thus allows for on-line image manipulation by emulating the browser-based transformations (such as re-sizing or overlaying images), made by the user on a representation of the image, on the server so that the images produced can be used for personalised product creation.

On-line image manipulation is allowed by creating a two-tier architecture, in an embodiment according to the invention: there is one program that allows image manipulation on the screen in front of a user; and a second program on a server that emulates these manipulations, so that the images can be output for personalised product creation. In the preferred embodiment, the back end process, or elements of it, can be performed in a secure computing environment; and customised images can be printed onto an actual product under very high security (for example, bank level security). In this way, a user with internet access can design customised images for printing on a remote product which requires secure treatment, such as bank level security. For example, anti-fraud and anti-theft measures mean that the production of credit cards, and other types of transaction cards, is performed in secure locations. Customisation of the designs applied to such cards is thus possible, using preferred embodiments, without the need to give the user direct computing access to the secure environment.

An online image-editing tool uses the browser environment of HTML and Macromedia Flash as a Graphical User Interface for remote software that emulates the actions taken on the client machine, in an embodiment according to the invention. This enables a fast experience for the user and a high quality end product. However, the browser-based, client-side environment allowing manipulation by the user need not necessarily be Flash from Macromedia. Any equivalent software tool capable of providing the required functionality could be used—for example, any tool capable of generating a representation of an image, applying manipulations thereto, and transferring the results through a set of commands to the server-side software, such that an image processor on the server side can emulate the actions of the front end and create a result image that can be saved to the server. The front end software will allow the upload of images from the user's computer to the server, so that the user's own images can be manipulated and overlaid with "stock" images and borders. Then, by communicating with the back end software, it is possible to produce personalized goods for a user. Such personalized goods may include, for example, credit cards, debit cards, mobile phone covers, mugs, T-shirts, gift cards, and framed prints.

An embodiment according to the invention has the advantage that high quality images do not need to be uploaded to the customer's browser during the manipulation process, because lightweight, web-enabled formats are instead used for the user's experience, thereby making the system fast and easy to use. However, when the information is transferred, the original high quality images are used to give high quality print results. An embodiment according to the invention also allows the provision of light-weight but fast graphics manipulation, without the complication of downloading programs. Additionally, a user interface according to the invention is not constantly calling to the server; thus the interface is quick and pleasant to use, and Internet bandwidth is used efficiently. As another advantage of an embodiment of the invention, the original image is not transferred over the internet at the manipulation stage, so that the possibilities for hacking the image are greatly reduced. Also, because the interface runs within the Macromedia Flash environment, the interface is platform independent. Further, because the final image may be created on a server controlled by a single company, the final image output may be made to have a standardized size and resolution. This enables easy integration with printers, simplifies the production of a personalized product, and simplifies billing on a per-image basis.

Figure 8:
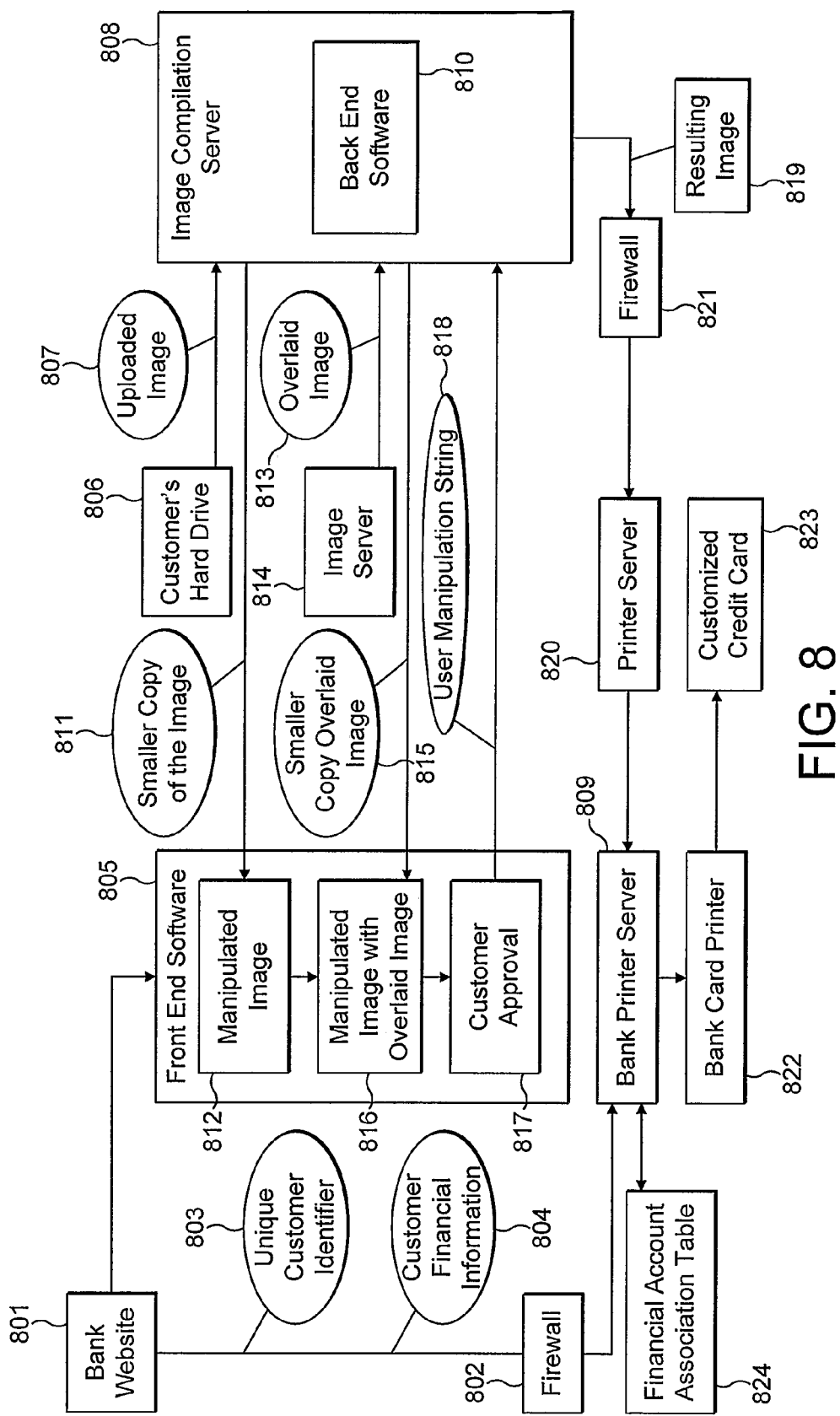
FIG. 8 illustrates a computer system for remote manipulation of images, in accordance with an embodiment of the present invention.
Figure 9:
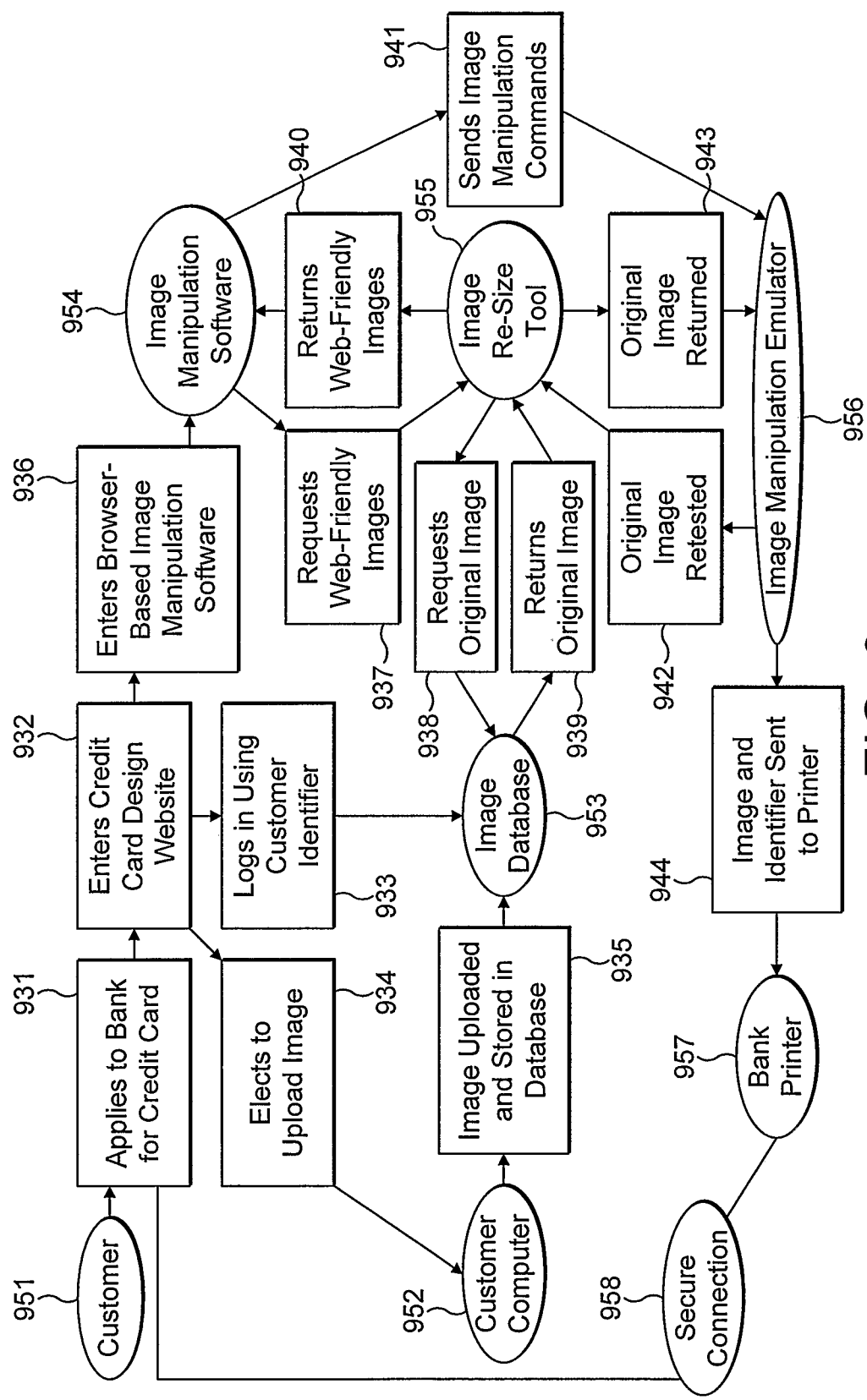
FIG. 9 illustrates a method of operating a computer system for remote manipulation of images, in accordance with an embodiment of the present invention.

By way of example, FIGS. 8 and 9 describe the production of a credit card, in accordance with an embodiment of the invention.

In the embodiment of FIG. 8, a customer accesses software according to the invention, after having applied for a credit card through a web site 801 of a card issuer (such as a bank). In the first step, the card issuer issues the customer with a unique identifying number 803 which is passed to an image compilation server 808, which may (or may not) be operated by a company other than the card issuer. The card issuer associates the unique customer identifier 803 with the customer's financial information 804. This association may be performed in a financial account association table 824 maintained in an environment that is secure from the user interface. The associated customer identifier 803 and financial information 804 are passed to a bank (or other card issuer) printer server 809 via a firewall 802. Next, the customer enters the front end software 805, which may be operated by a website server or other front end server. The customer chooses an image 807—in FIG. 8, from the customer's computer hard drive 806, and uploads it to the image compilation server 808. The image 807 could come from any suitable source such as an image library maintained by an operator of the image compilation server 808. Back end software 810, running on the image compilation server 808, now enters the original image into a database and generates a web-friendly smaller copy 811 to send to the front end software 805. The customer now performs image manipulations 812 (such as resizing, rotating, and placing the image), as the customer desires. The back end software 810 associates the customer image selection, and subsequent manipulations and selections, with the unique customer identifier 803. Next, the customer chooses another image 813 to overlay on top of the first image 807, and positions image 813 as desired. The overlay image 813 may, for example, be a transparent decorative frame for the uploaded image 807, and may be maintained in an image server 814. The back end software 810 transmits a web-friendly, smaller version 815 of the overlay image 813 to the customer, for use in a creating a combination 816 of the original manipulated image 807 with the overlay image 813. Once customer approval 817 of the final design 816 is achieved and indicated to the front end software 805, the front end software 805 transmits a string of user manipulation data 818 to the image compilation server 808. This string 818 encapsulates the customer's image selections and manipulations. On receiving this string 818 the back end software 810 accesses the original copies of the images from an image library and performs the exact operations that the customer has chosen in the front end software 805 for the customer's final design. In this way, the back end software 810 emulates the manipulations at the user end according to the information transferred in the text string (also referred to herein as the results script). At this point the back end software 810 can output the resulting image 819 to a printer server 820, which may be performed through a firewall 821. The resulting image 819 and associated customer identifier 803 may then be passed to the bank (or other card issuer) printer server 809, which in turn accesses the financial account association table 824 to obtain the associated secure customer financial information 804. The financial information 804 and resulting image 819 may then be sent to a credit card printer 822, which prints a customized credit card 823. All of the images that are used by the customer in the front end software 805 are issued via the back end software 810. The only information which passes to the back end software 810 from the front end software 805 (apart for requests for images) is data about how the image in front of the customer appears. This information can easily be encrypted for increased security. The number of images combined in a design is not limited to one or two (such as images 807 and 813)—the script can be easily amended for many more layers. Also, transparent frame image layers need not be selected and manipulated before a non-transparent image layer; the image layers can be designed in any order. Text can also be added to the image through a similar replication. The output image can be sent to any type of machine and thus the possible applications are very wide-ranging: the software can be applied not only to the payment card market, but also for non-payment and telephone cards. In certain embodiments, layers may be employed as templates and/or marks, referred to herein as transparencies. In one embodiment, the final image displayed on a card may be restricted to a selected pre-defined area, such as a "window" on a payment card (or other financial account access means), leaving the rest of the card free to contain functional features of the card, such as a bank logo, a payment card hologram or type indicator (such as, for example, "Visa" or "MasterCard" logos). Alternatively, some image layers may be positioned within such a selected window on the card; while other image layers (such as transparencies) are positioned outside the selected window, but surrounding the functional features of the card (such as the bank logo, payment card hologram, etc.). Also, the bank logo or other financial feature can act as a fixed template, behind which the user can move the image to a desired position.

In the embodiment of FIG. 9, in a first step 931, a customer 951 has applied to a bank (or other card issuer) online for a credit card, or is an existing customer offered the opportunity to make a new card for an exising account. In step 932, the customer clicks a link redirecting the user to a website (which may be operated by a company other than the card issuer) for designing the credit card—arriving with a unique identifier which relates to the customer's account and which will be carried with the customer throughout the customer's time on the site. In step 933, the customer identifier is used to log-in; alternatively, the customer could log-in separately at this point and recollect the customer's identifier. Since the design website uses only the customer identifier to identify the customer, it does not obtain any of the customer's financial details. In step 934, the customer elects to upload an image from the customer's own computer 952, such as a scanned or photographed image. In step 935, the image is uploaded to an image server, and may be held in a database 953 for convenience. In step 936, the customer enters browser-based image manipulation software 954. In step 937, the image manipulation software requests a series of images in web-friendly formats from an image re-size tool 955, so that the process is fast and quick to use. In step 938, the image re-sizing tool requests the original image from the database 953; in step 939, the original image is returned and re-sized to a web-friendly format and size; and in step 940, a set of web-friendly images is returned to the image manipulation software 954 (these are graphical representations of the original images on which manipulations can be performed). Once the customer has achieved the desired effect by manipulating the series of images required, the associated image manipulation commands are sent 941 to an image manipulation emulator 956. Image manipulation commands can include, for example, rotating, re-sizing, positioning, flipping, scaling, brightness controls, red-eye reduction, opacity levels, and other manipulations. In step 942, the image manipulation emulator 956 then requests the original images from the image server so that the best quality image is used. Upon receiving the images in step 943, the emulator 956 then repeats the completed transformations of the customer and creates an image that emulates the one created online, but that uses the original, higher quality graphics. In step 944, this image, and the associated customer identifier, is sent to the bank's printer 957. The financial data corresponding to the customer identifier is obtained, via a secure connection 958 to the bank (or other card issuer); and the printing process set in motion.

In an embodiment according to the invention that places personalized images onto plastic, credit card-style cards, it is necessary to ensure a very high level of security. Therefore, in circumstances where there are already financial records in place for the user, the architecture receives a unique non-sequential customer identifier, which matches with a set of financial records, from the credit card issuer. This customer identifier is passed through each element of the system and is returned with the generated image file. Thus in a "mail merge"—type operation, the customer's personalized image can be matched up with the customer's financial and personal records, so that the correct image is placed on the card. At no time does either the front end or back end software have any financial information. The customer identifier may be used in an automated log-in process. In this way, the software (both the front end and back end software) can know whether the user is new or not. A returning visitor can thus be presented with images that were uploaded on a previous visit.

The system's architecture comprises two distinct elements, in an embodiment according to the invention. The front end element, the element that the user interacts with, is built in Macromedia Flash. This element allows the user to design a card by manipulating (through scaling, rotating, or performing other manipulations such as those given above) the image uploaded and then overlaying the image with frames that can contain transparent sections. Since Flash does not have "local permissions" on the client machine, as it is a browser-based interface, it is not capable of saving the final design. It therefore sends a string of instructions to the second, serverside element. The second, serverside element may be written in C#, although Java, C, C++, or any other suitable language would be equally capable. The string of instructions may be sent as a "querystring," i.e. as part of the URL; for example, the string could be formatted as:

(createpage.aspx?here_are_the_string_of_instructions& rotate=90&flip=yes . . . )

Other methods may also be used for transmitting the user's design manipulations, such as using an HTML style "form," or writing the information to a Cookie and then re-reading the information. Alternatively, the hypertext transfer protocol commands HTTP "POST" and HTTP "GET" may be used to pass data from the user session to the server. HTTP "POST" works in an identical fashion to a standard website form; while HTTP "GET" works by changing the URL. For example, an HTTP "GET" could change a URL, in order to transfer a user's rotation, scaling, and other selections, to read:

http://www.personalcard.net/saveinfo.aspx?rotate= 90&flip=no&scale=232&x=232&y=12&y2= 343&x2=333 etc.

This list of techniques for transmitting the manipulation results is not intended to be exhaustive. Alternatives and future developed techniques will also be suitable.

The customer identifier may be passed using Session State (the webserver's Session Object) or by passing as part of the "querystring," in accordance with an embodiment of the invention. HTML "forms" could achieve the same ends.

In accordance with an embodiment of the invention, an image can be uploaded as a JPEG, GIF, BitMap, PNG, Tiff etc.; although it will be appreciated that nearly any digital image can be uploaded or output. From the original uploaded image the system creates four separate versions:

1. A thumbnail version (as a JPEG)—see the interface screenshots, below. The image is approximately 1 to 2 k in file size.
2. A larger, but still web-optimized version (this is scaled to allow the image to be expanded to the maximum available by the interface—such as scaling 250%—and still have one-to-one pixel matching (i.e. the image size is width 241×250% if possible). This is the image used on screen for the design of the card.
3. A Bitmap image at the same scale as the original image. A Bitmap image may be used, for example, in a system that uses C#, which is a Microsoft language and uses Bitmap as the default image type.
4. The output design, which may be sized in proportion to a credit card. This design could be of any software format that is useful to the printer used, such as BMP (Bitmap) or PNG (Portable Network Graphic).

The original images may be placed into a database once they have been uploaded. In one embodiment, each request for images requires going back to the original version to use; however, this need not be the case, because once another image version has been created (e.g. a thumbnail version), the system can equally store this version so that the processing is reduced (though memory taken would increase). A key benefit of an embodiment according to the invention is that it is not necessary to pass the largest image backwards and forwards across the web from client to server, except for the initial upload of images. Nonetheless, when the final edited design or image is generated, the highest quality image is used.

In an embodiment according to the invention, the user designs, on screen, an image that appears the same physical size as a credit card using the screen resolution of 72 dpi. This is because a computer monitor cannot present images at a higher resolution than this. However, a printer can output at higher resolutions, typically 300 dpi or greater—increasing the quality. Although the front end software uses the low resolution images, the final design is compiled by the back end software using a full scale, bitmap version of the original image uploaded. This may be achieved by using a "virtual canvas" within the back end software that is larger than the design canvas within the front end software. Thus the design being created by the back end software is laid on to a background of greater size than in the front end software (while maintaining 72 dpi resolution). Thus, if the credit card size in pixels is 241 by 153 then, by laying the image on a "virtual canvas" credit card of, 1050 by 672 at 72 dpi, the resolution can be increased to approximately 300 dpi when the credit card is finally printed (back at 3.3 inch by 2.1 inch). This method ensures that the maximum dpi achievable (to the printer's maximum setting) is output from the back end software, but only the resolution necessary is sent to the front end software. This reduces the memory requirements of the client machine and the Internet traffic. This operation could equally be achieved by changing the resolution of a 72 dpi image to 300 at the original size.

In order to use transparencies, in an embodiment according to the invention, the images containing a transparent layer (usually frames or borders) must be converted into Flash "movies" themselves. This process can be manual, but can also be automated to allow images with transparencies (such as bitmaps or PNG) to be imported into the front end software "on the fly." The back end software can use the original PNG or BMP image to generate the credit card image.

Figure 10:
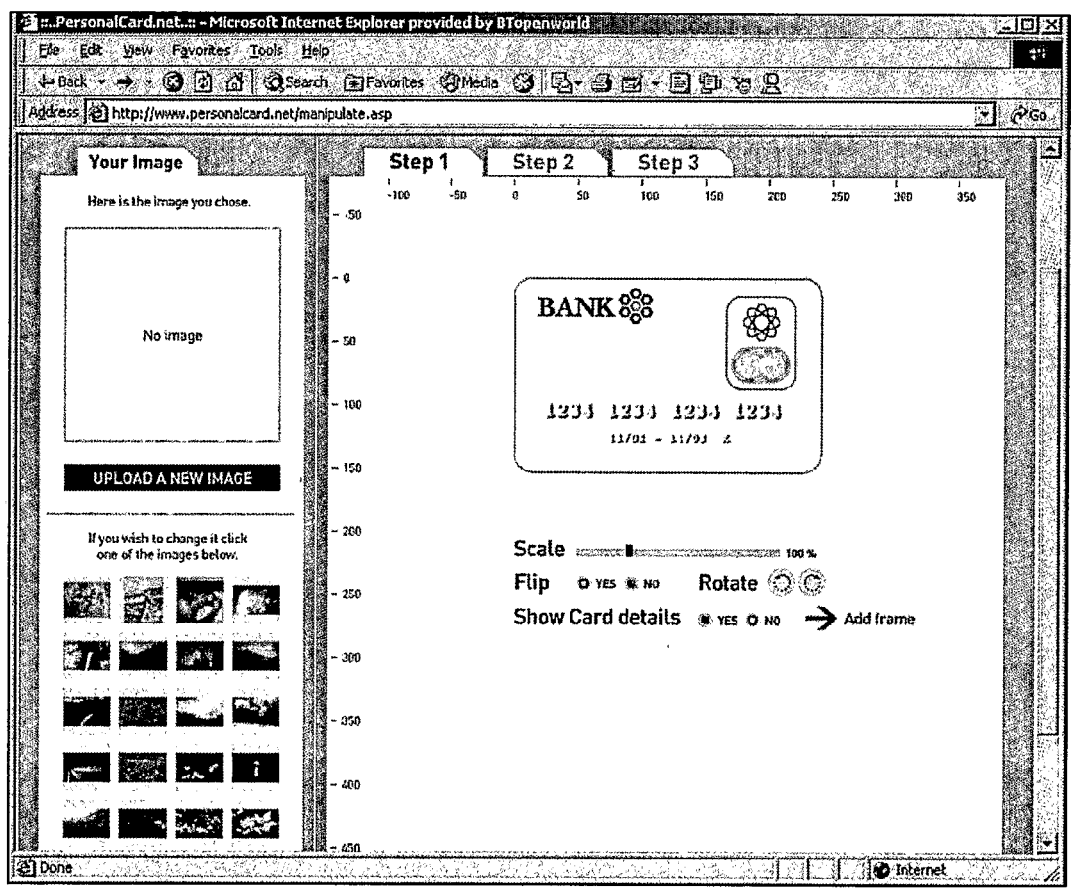
FIGS. 10-17 show screens of a credit card design website, operated in accordance with an embodiment of the invention.
Figure 11:
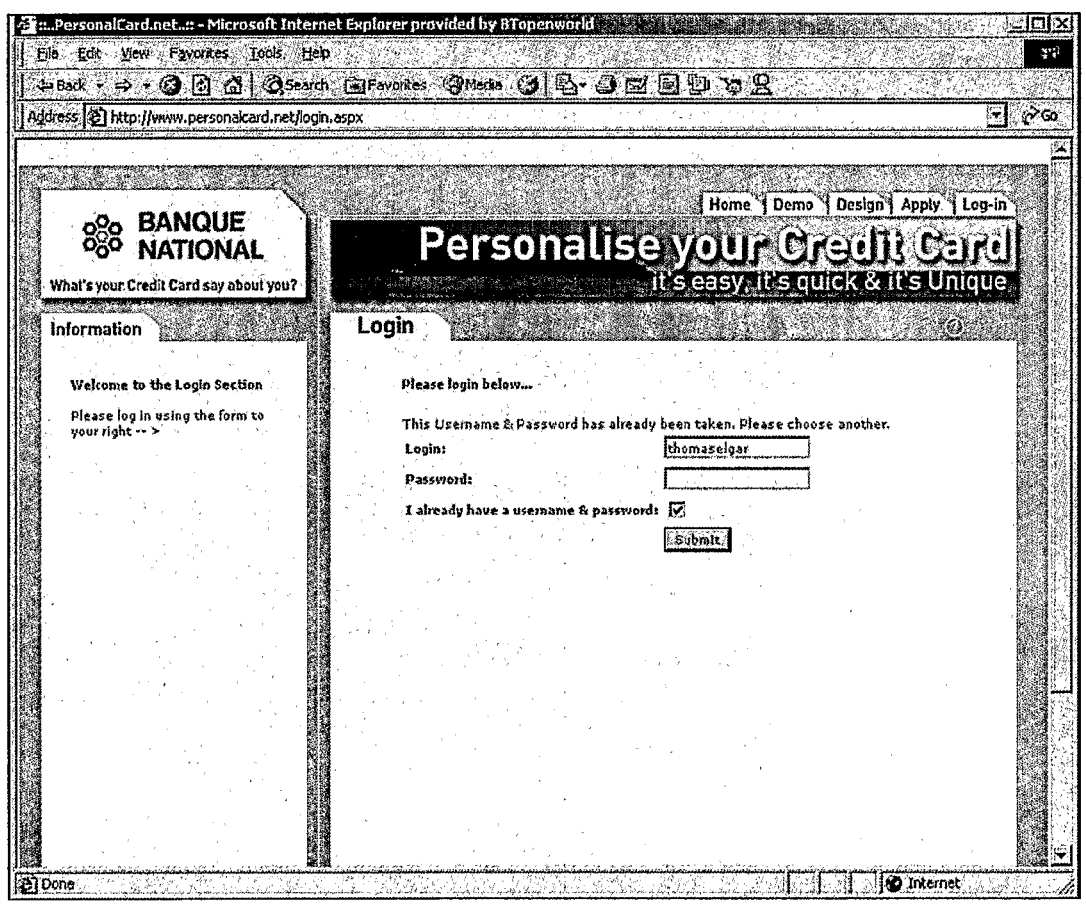
Figure 12:
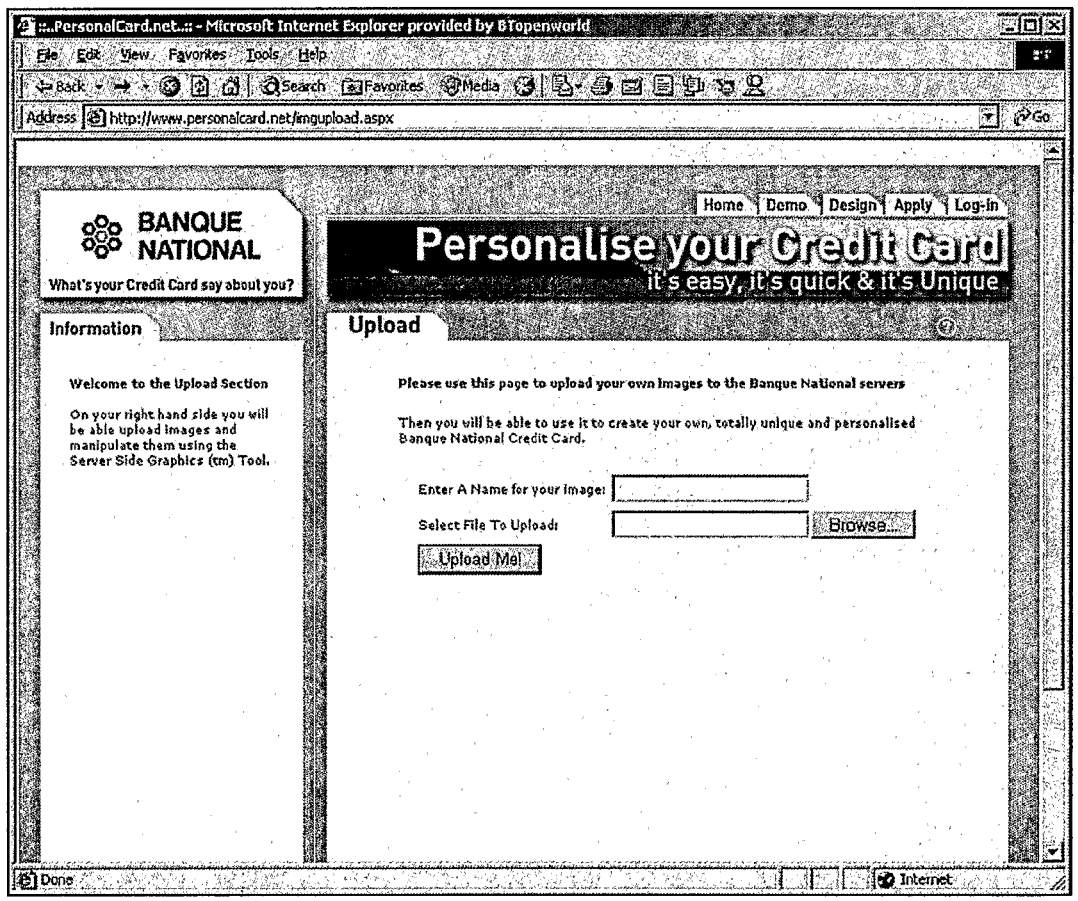
Figure 13:
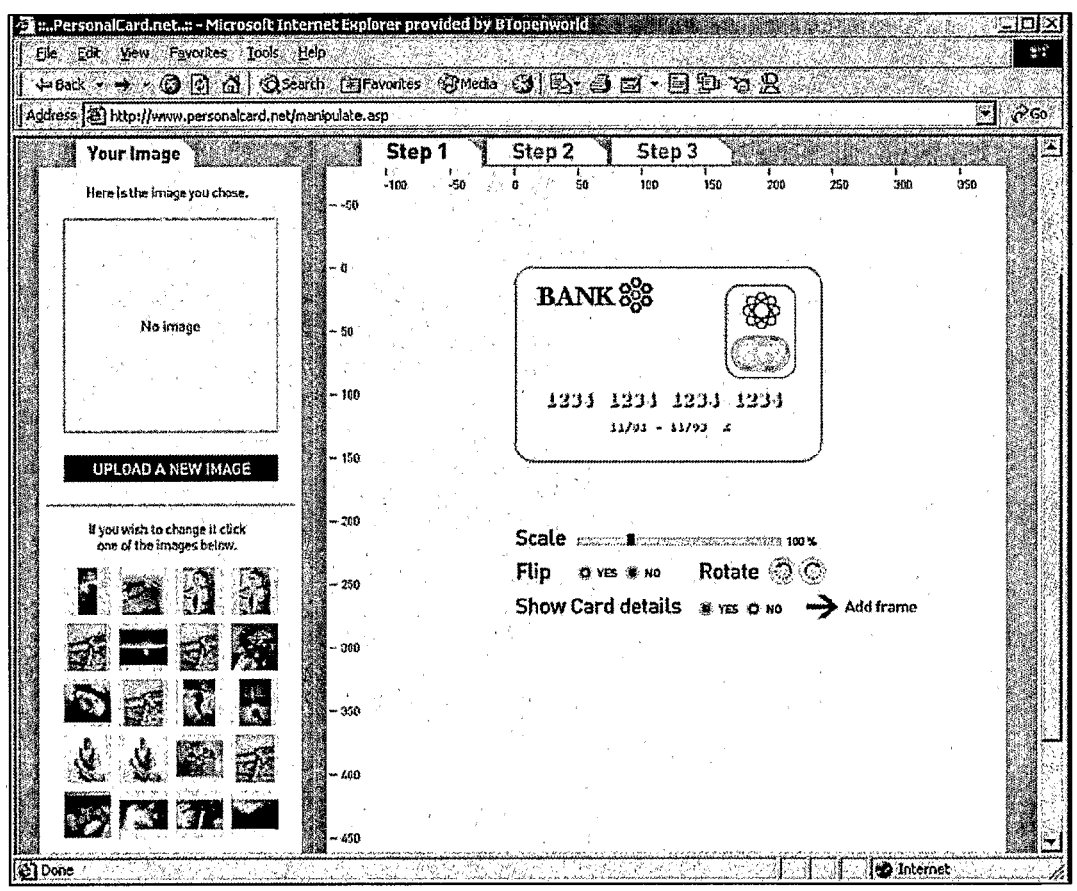
Figure 14:
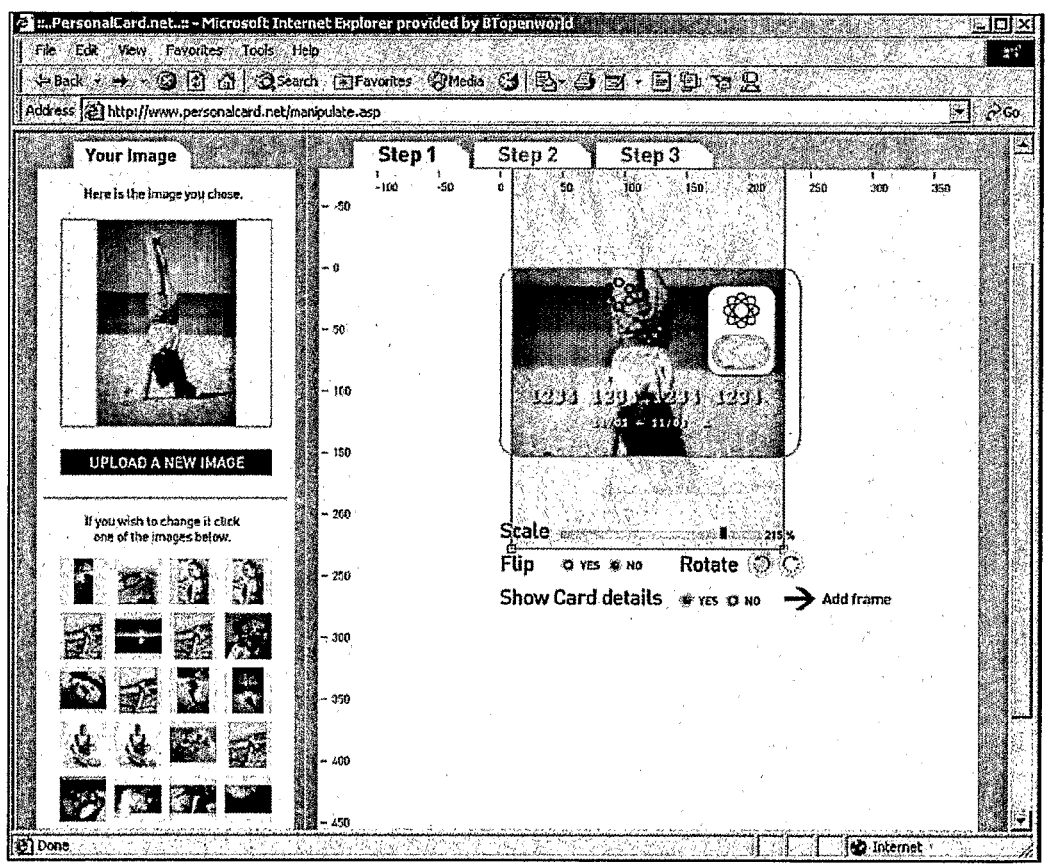
Figure 15:
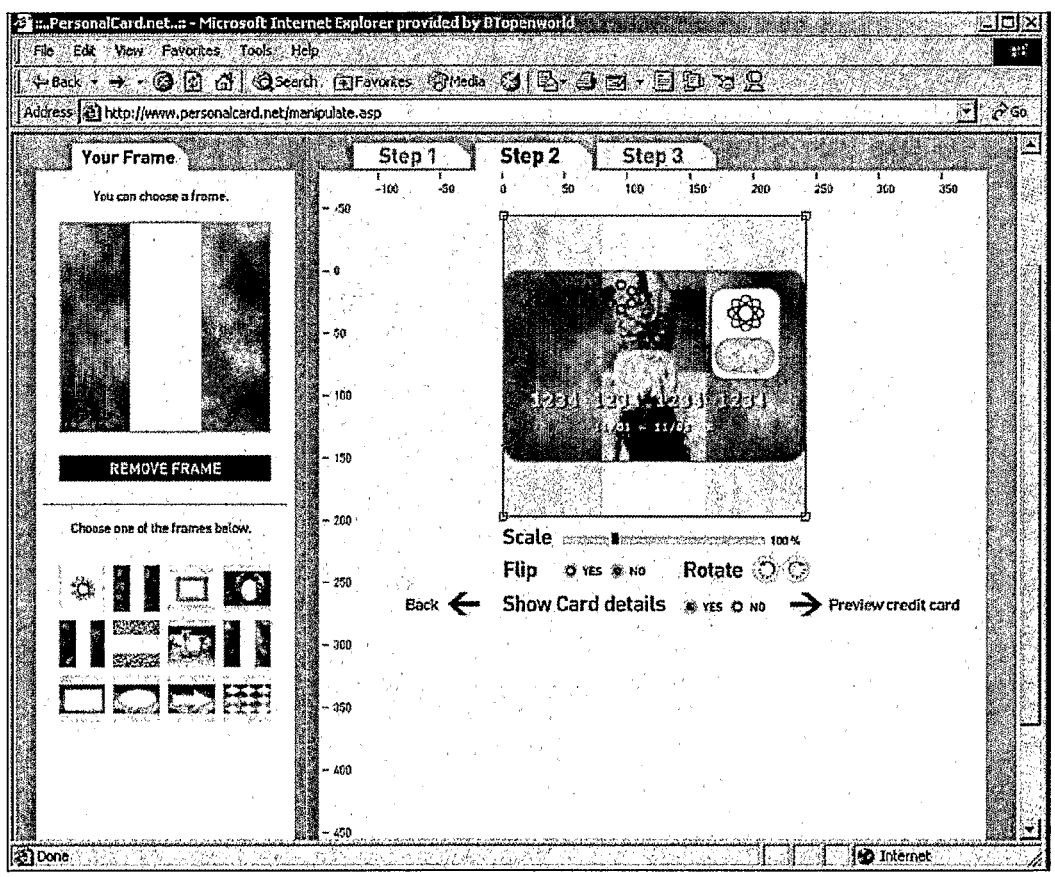
Figure 16:
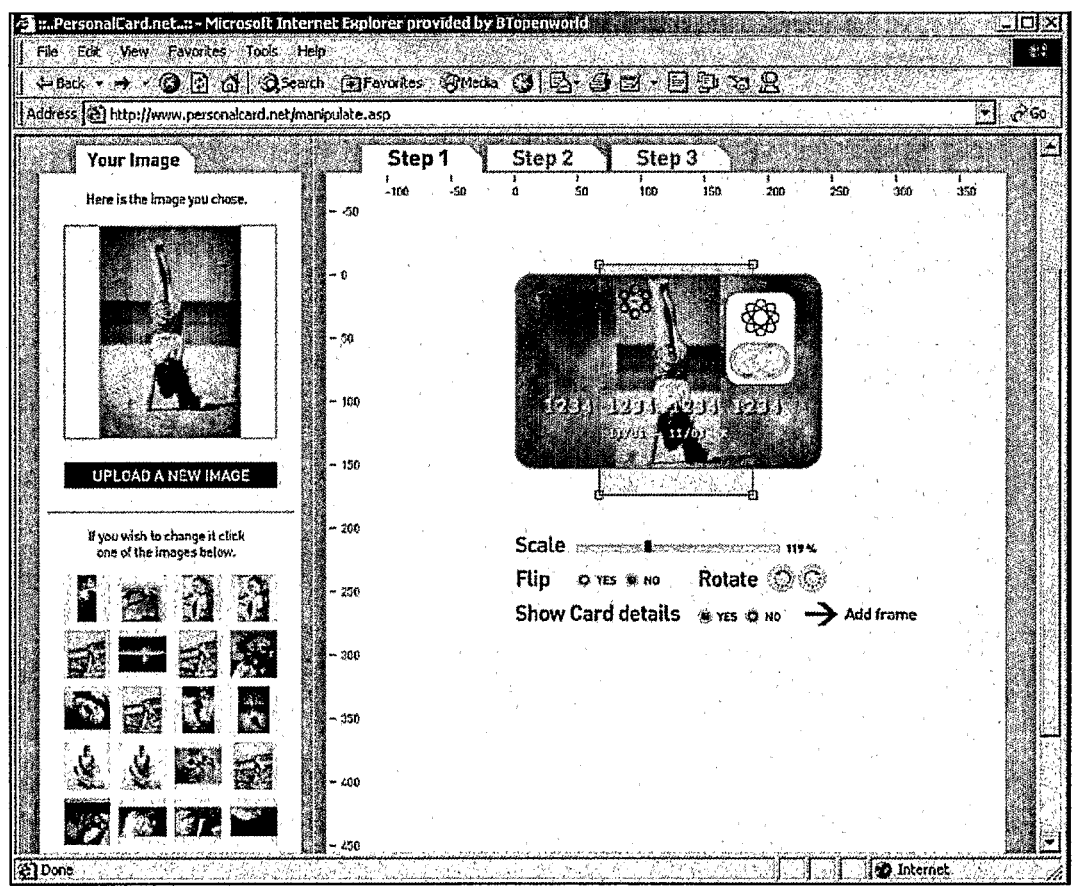
Figure 17:
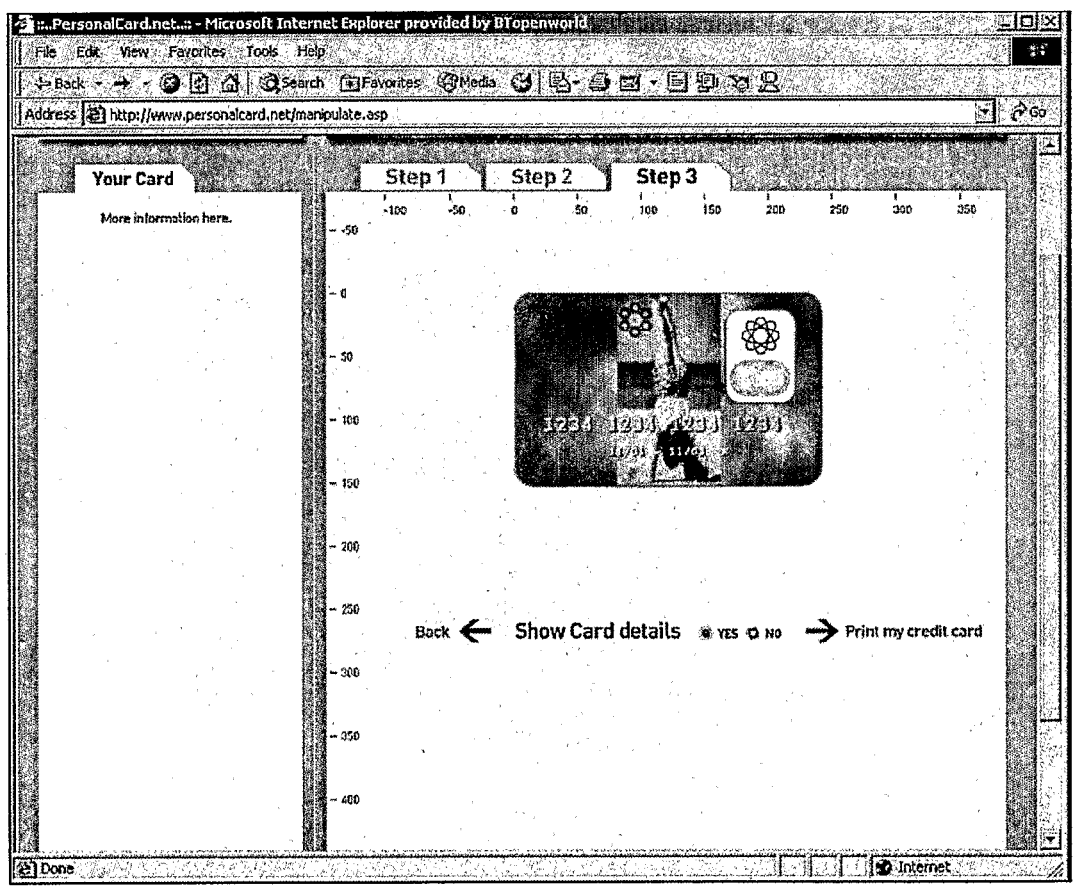

FIGS. 10-17 show screens of a credit card design website operated in a series of steps according to an embodiment of the invention. FIG. 10 shows a first screen, with a standard library of images assigned to the particular card issuer that is using the credit card design website, on the left of the screen. FIG. 11 shows a screen allowing users to log in so that they can load new images in to the left hand side library. This can be automated in live versions. In FIG. 12, the upload allows the user to browse his or her own computer for images to upload. FIG. 13 shows a screen with a new library including both the user's images and a set of stock images. In the screen of FIG. 14, by clicking on the thumbnail image on the left hand side, the bigger but still web-optimized image is loaded. At this point it can be scaled, flipped, rotated, or undergo other manipulations; and the card details can be viewed or hidden. In the screen of FIG. 15, frames can then be added. These are Flash (.swf) files that allow transparencies. Again they can be flipped, scaled, rotated, or undergo other manipulations; and the card details can be hidden. In the screen of FIG. 16, by clicking on the red Back Button or on the Step 1 tab, the user can return to a previous screen. At this point the image is shown as "live" but the frame can be seen as well. The screen of FIG. 17 shows the final version of the credit card before it is sent off to the back end software to be created.

Figure 19:
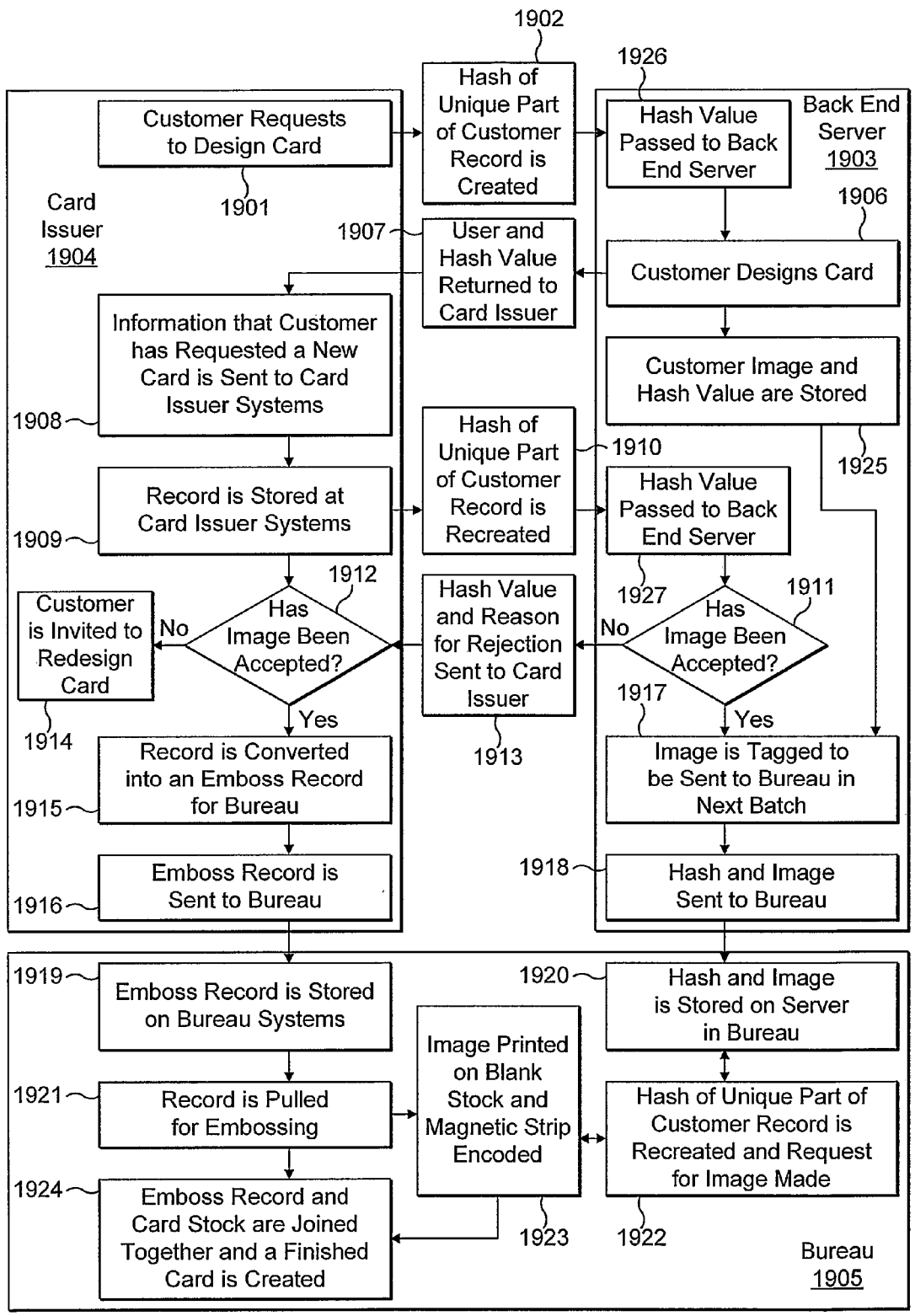
FIG. 19 illustrates a method of operating a computer system for remote manipulation of images, using a hash value to avoid the need for creating and maintaining a unique customer identifier through the card application and printing lifecycle, in accordance with an embodiment of the present invention.

In accordance with a further embodiment of the invention, shown in FIG. 19, a bank or other card issuer need not create a unique identifier for a customer, and pass that identifier through the card issuer's own system. Given the complexity of banking systems, avoiding the need to create such an identifier can be an advantage.

Figure 18:
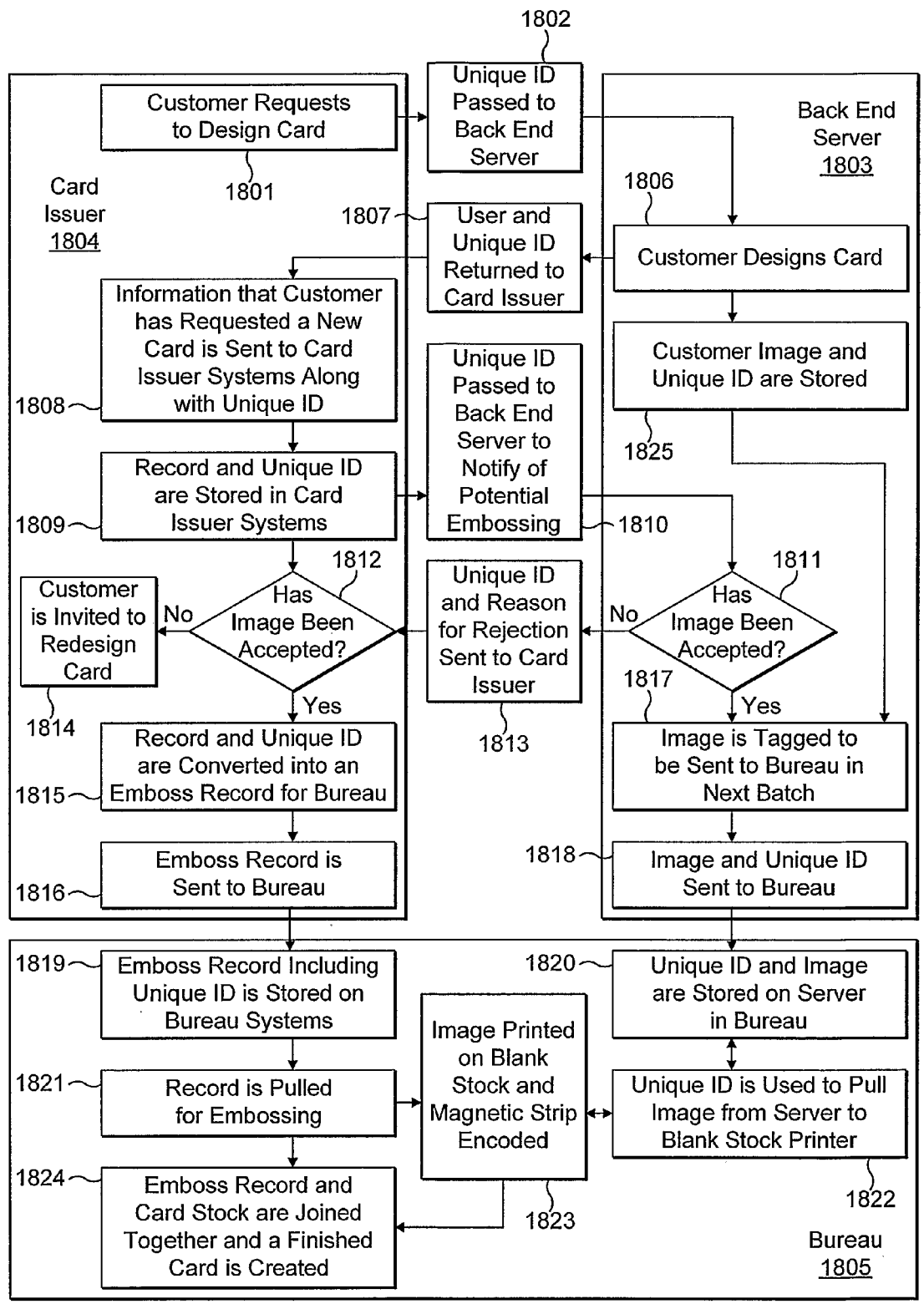
FIG. 18 illustrates a method of operating a computer system for remote manipulation of images, using a unique customer identifier, in accordance with an embodiment of the present invention.

Before illustrating the alternative of FIG. 19, FIG. 18 first illustrates an embodiment that may be useful for some card issuers, in which a unique identifier is created for each customer. In this embodiment, a unique identifier is created for each customer that requests to design a card 1801, and passed 1802 to the back end server 1803. The back end server 1803 creates an image corresponding to the customer's unique identifier; and the card issuer 1804 passes the unique identifier through the card issuer's own system. A bureau 1805 that creates the final card can then make a software call to the back end server 1803 using the unique identifier, so that the account details received from the card issuer 1804 may be associated with the image.

In further detail, the embodiment of FIG. 18 functions as follows. Upon a customer requesting to a card issuer 1804 to design a personalized card 1801, the card issuer 1804 creates a unique identifier and passes the identifier 1802 to the back end server 1803. Once the customer designs the card 1806, the user and corresponding unique identifier are returned 1807 to the card issuer, and the back end server stores 1825 the customer image and unique identifier. The information that the customer has requested a new card is then sent 1808 to the card issuer's systems, along with the unique identifier; and a record and unique identifier for the customer are stored 1809 in the card issuer's systems. The card issuer then passes 1810 the unique identifier to the back end server, to notify it that the new card will potentially be created and embossed. The back end server 1803 and/or card issuer 1804 can then perform an image checking procedure 1811 and 1812, to ensure that the image designed by the customer is acceptable for production. If the image fails the back end server's image checking 1811, the unique identifier and reason for the image's rejection is then sent to the card issuer 1813; and the customer is invited 1814 to redesign the card. Once the image has been accepted, the card issuer converts 1815 the customer's record and unique identifier into an emboss record, which is sent 1816 to the bureau 1805 that will be creating the card. The back end server tags the image 1817 to be sent to the bureau 1805 in the next batch of images; and, when a suitable number of images are ready, sends 1818 the image and associated unique identifier to the bureau 1805. The bureau 1805 next stores 1819 the customer's emboss record and unique identifier, obtained from the card issuer 1804; and also stores 1820 the unique identifier and image, obtained from the back end server 1803. Having done so, the bureau 1805 can now create the finished card, by first obtaining 1821 the customer's record provided by the card issuer 1804; and also using 1822 the unique identifier to obtain the associated customer image and provide it to a blank card stock printer. The blank stock printer may then print 1823 the image onto blank stock, and encode the card's magnetic stripe. Based on information in the magnetic stripe, the emboss record and printed card stock may then be joined together 1824 to create a finished card.

By contrast with the process of FIG. 18, the embodiment of FIG. 19 allows a card issuer to avoid the need to create for each customer a unique identifier that must be passed through the card issuer's system. Instead, the card issuer creates a "hash value," such as a message digest, or other one-way code, based on some account details for each individual, so that the card issuer can pass customers' account information to the back end server in a way that is completely safe. Referring to FIG. 19, the process is similar to that of FIG. 18, with a card issuer 1904, a back end server 1903, and bureau 1905 performing analogous steps (1901 and following) to those of FIG. 18 (1801 and following). However, a principal difference is found in steps 1902, 1907, 1910, 1913, 1926, and 1927 of FIG. 19, in which a "hash value" (or other one-way code) is passed between the card issuer 1904 and the back end server 1903, instead of requiring the card issuer to create a unique identifier for each customer, as in FIG. 18. First, in step 1902, a hash of a unique part of the customer record (such as the customer's name) is created. A one-way hash, such as the MD5 hash, is a process that takes arbitrary-sized input data (such as a customer's name and account number), and generates a fixed-size output, called a hash (or hash value). A hash has the following properties: (i) it should be computationally infeasible to find another input string that will generate the same hash value; and (ii) the hash does not reveal anything about the input that was used to generate it. This means that the hash function used in the embodiment of FIG. 19 allows the card issuer 1904 to pass at least some of a customer's account information to the back end server 1903 in a way that is completely secure. As seen in steps 1902, 1907, 1910, 1913, 1926, and 1927, a hash value may be passed back and forth between the card issuer 1904 and the back end server 1903, without the need for the card issuer 1904 to create a unique identifier and pass it through its system.

In further detail, the embodiment of FIG. 19 functions as follows. Upon a customer requesting to a card issuer 1904 to design a personalized card 1901, the card issuer 1904 creates a hash value of a unique part of the customer's record 1902 and passes the hash value 1926 to the back end server 1903. Once the customer designs the card 1906, the user and corresponding hash value are returned 1907 to the card issuer, and the back end server stores 1925 the customer image and hash value. The information that the customer has requested a new card is then sent 1908 to the card issuer's systems; and a record for the customer is stored 1909 in the card issuer's systems. The card issuer then recreates 1910 the hash value that is based on the unique part of the customer record, and passes it 1927 to the back end server 1903, to notify it that the new card will potentially be created and embossed. The back end server 1903 and/or card issuer 1904 can then perform an image checking procedure 1911 and 1912, to ensure that the image designed by the customer is acceptable for production. If the image fails the back end server's image checking 1911, the hash value and reason for the image's rejection is then sent to the card issuer 1913; and the customer is invited 1914 to redesign the card. Once the image has been accepted, the card issuer converts 1915 the customer's record into an emboss record, which is sent 1916 to the bureau 1905 that will be creating the card. The back end server tags the image 1917 to be sent to the bureau 1905 in the next batch of images; and, when a suitable number of images are ready, sends 1918 the image and associated hash value to the bureau 1905. The bureau 1905 next stores 1919 the customer's emboss record, obtained from the card issuer 1904; and also stores 1920 the hash value and image, obtained from the back end server 1903. Having done so, the bureau 1905 can now create the finished card, by first obtaining 1921 the customer's record provided by the card issuer 1904; and also using 1922 the hash value to obtain the associated customer image and provide it to a blank card stock printer. The blank stock printer may then print 1923 the image onto blank stock, and encode the card's magnetic stripe. Based on information in the magnetic stripe, the emboss record and printed card stock may then be joined together 1924 to create a finished card.

In an alternative to the embodiment of FIGS. 18 and 19, which utilize a unique identifier and a hash value, respectively, other methods of creating a secure user identifier may be used. For example, it is also possible for the user information to be encrypted at the card issuer at the beginning of the process, and decrypted at the card bureau using a Private/Public Key or a Private/Private Key encryption technology. This alternative works in a manner similar to the process described in FIG. 19, but with modified security measures; for example, the key must be held by the card bureau.

In another embodiment according to the invention, a secure identifier of the image that is produced based on the user's instructions, may be embedded in the image itself, or embedded as part of the data file in which the image is stored. For example, a hash key, encrypted identifier, or other secure identifier may be passed through the back end server (such as server 1803 or 1903) in association with the user's image manipulation instructions. At any point in the back end server process, such as when the image is produced for sending to a card bureau (such as card bureau 1905), the image then can be made to have the secure identifier embedded in it—such as by embedding a bar code or other machine-readable code, which encodes the secure identifier, placed in the image itself. In this way, the card bureau 1905 can read the bar code, or other embedded secure identifier, directly from the image itself; and need not acquire any information from the back end server 1903 except for the image itself, which includes the bar code. This embodiment finds particular use in the case where the card production process of the bureau 1905 involves using an image printer, which is not capable of separately storing or passing on the secure identifier. Thus, by using the embedded secure identifier, the image printer can effectively pass on the secure identifier as well as the image to the embossing stage, simply by passing on the printed image itself, which will include the bar code (or other embedded machine-readable identifier). The embossing stage can then involve reading the bar code (or other embedded machine-readable identifier) from the image, and looking up the associated emboss record for use in final card production. It should be noted that the image printing function of bureau 1905 need not be performed within a single organization or enterprise; for example, the image printing may instead be performed by a separate enterprise or department from the organization that performs the embossing, in accordance with an embodiment of the invention. It will be appreciated that a variety of different techniques can be used for embedding the secure identifier in the image, such as by including the identifier in the metadata of the image file; including both when the image file is transmitted to the bureau 1905, or when the image file is in use by the back end server or the bureau.

Figure 20:
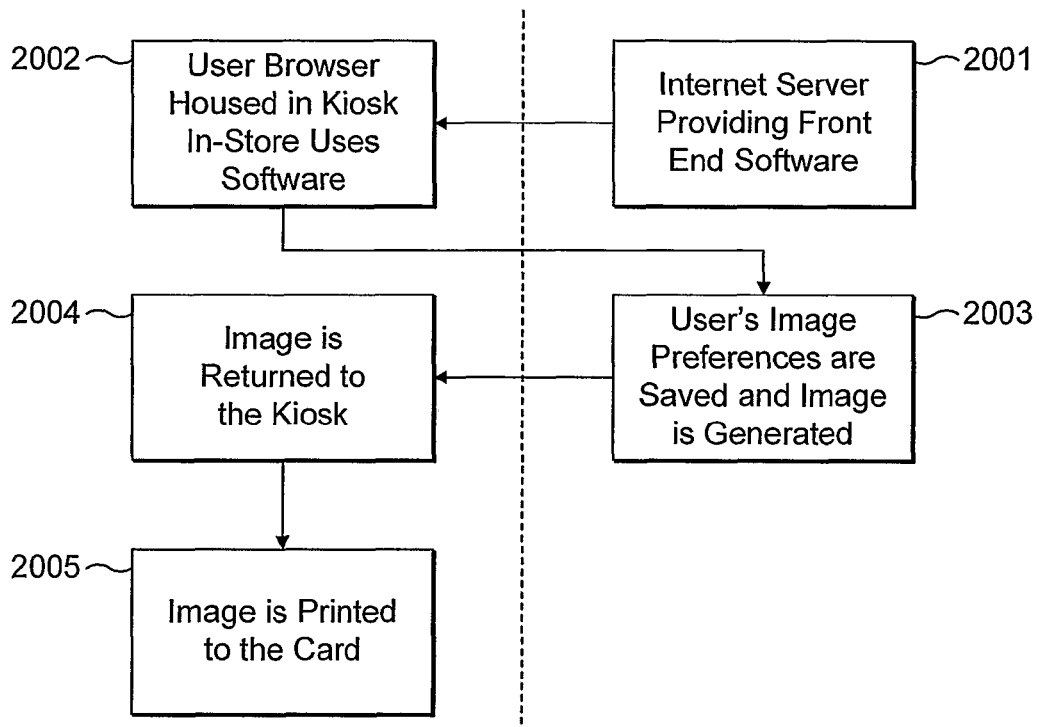
FIG. 20 illustrates a system according to an embodiment of the invention, in which an image is designed using a card-issuing kiosk or in-store instant issue system.

In another embodiment according to the invention, shown in FIG. 20, a modified architecture may be used, in the context of a card-issuing kiosk or in-store "instant issue" system. As with embodiments described above, front end software runs on a client-side browser; and back end software runs on a remote webserver. However, unlike in the above embodiments, the card printer is located on the client machine (such as a card-issuing kiosk). With reference to FIG. 20, a user browser housed in an in-store kiosk 2002 uses the front end software, which is provided from an internet server 2001, to allow a customer to design a personalized card. The user's image preferences are then saved and the image is generated 2003 on the remote webserver. The image can then be returned to the kiosk 2004, and printed to the customer's card 2005. Images may be checked on the remote server side, to ensure that they are suitable for printing, in real time, if required. Otherwise the operation of the system may be similar to the embodiments described above.

Figure 21:
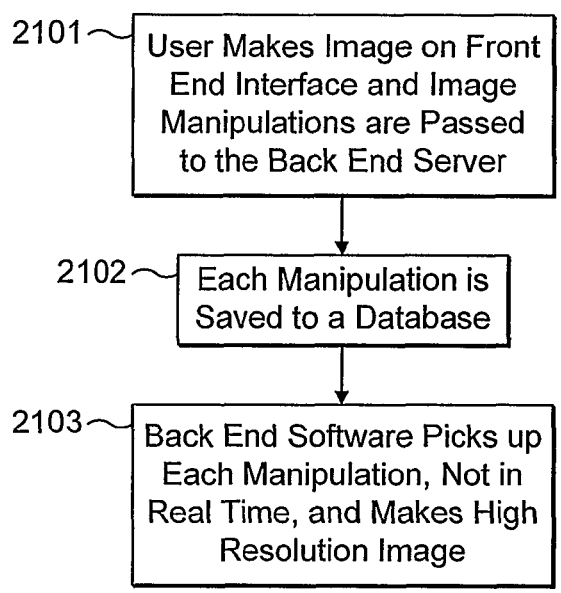
FIG. 21 illustrates a system in which a database is used to store information between a user's image selections and back end image production, in accordance with an embodiment of the invention.

In a further embodiment according to the invention, shown in FIG. 21, a database can be used to store information between the user's image selections, and the back end image production. In this way, the system can be made more scalable, since it does not need to create the images on the back end in real time. As with the other embodiments, the user first makes image selections on the front end interface software, and the image manipulations are passed to the back end server 2101. Then, however, each user's manipulations are saved to a database 2102; so that the back end software can pick up each manipulation, not in real time, and make the high resolution image 2103.

In a further embodiment, manipulations performed by the user are in relation to images held locally, for example, on the customer's hard drive 806. An image file may be loaded onto the customer's hard drive 806 by means of a local input/output means or via the network.

The browser-based software allows the customer to select a local image, for example from the hard drive 806, and perform manipulations to be applied to the image in the same way as described hereinbefore for remote images. The procedures for defining manipulations and the types of manipulation available are the same as defined hereinbefore for remote images. Data defining the or each manipulation applied to the local image is stored in the form of a user manipulation string 818. Both the user manipulation string 818 and the image file reside locally, for example on the customer computer, until they are transferred after the manipulations have been defined by the user, to the image compilation server 808, where the user manipulation string is interpreted and the manipulations defined by the user may be applied to the image. The manipulation string may be transferred as a single string or as several parts, likewise each part of the manipulation string may be transferred with or without the image file.

In this specification, the term "customer-defined image" is to be construed broadly to include any image, images or graphics; which has been selected by or an element of which has been defined by a user/cardholder. As such customer-defined images may originate for example (i) with the customer (perhaps in a personal photo collection), (ii) with a branding or merchandising enterprise, (iii) on the internet, (iv) with a card issuer, (v) a card manufacturer, (vi) a card graphics hosting facility, (vii) or any other source. The image may be "customer-defined" because it has been (a) selected, (b) generated, (c) modified or manipulated in some way by the customer, or perhaps (d) a combination of two or more of (a), (b) or (c).

While the foregoing has described what is considered to be the best mode and, where appropriate, other modes of performing the invention, the invention should not be limited to specific apparatus configurations or method steps disclosed in this description of the preferred embodiment. Those skilled in the art will also recognize that the invention has a broad range of applications, and that the embodiments admit of a wide range of modifications without departing from the inventive concepts.

The invention claimed is:

1. A method for producing a transaction card corresponding to an account of a customer and bearing an image defined by said customer, the method comprising:
    associating an optically-readable identifier with a customer-defined image to be applied to the transaction card;
    reading said optically-readable identifier to reconcile said optically-readable identifier with a corresponding identifier associated with customer account information to be applied to the transaction card,
        wherein said customer account information is provided by a card issuing authority on a secure link to a card finishing facility,
        wherein only said customer account information is transferred from said card issuing authority to said card finishing facility; and
    producing a transaction card bearing said customer-defined image and said customer account information.

2. A method as in claim 1, wherein the step of reconciling said optically-readable identifier with said corresponding identifier associated with said customer account information comprises deriving said corresponding identifier from said customer account information.

3. A method as in any preceding claim, wherein said customer account information and/or said corresponding identifier related to it are received securely from a card issuing authority.

4. A method as in claim 1 or 2 wherein after the step of reading said optically-readable identifier, a version of the identifier is encoded onto a recording medium on the transaction card.

5. A method as in claim 4, wherein said encoded version of the identifier is read as part of the process of reconciliation with said corresponding identifier associated with said customer account information.

6. A method as in claim 4, wherein the step of encoding a transaction card with a version of the identifier is performed at a site of a card manufacturer.

7. A method as in claim 4, wherein the step of encoding a transaction card with a version of the identifier is performed at a site of a card finishing facility separate from the site of the card manufacturer.

8. A method as in claim 1 or 2, wherein said customer account information comprises an embossing record for a financial transaction card.

9. A method as in claim 1 or 2, wherein said corresponding identifier associated with the customer account information is derived from the account information.

10. A method as in claim 1 or 2, wherein said corresponding identifier is derived from financial account information.

11. As method as in claim 1 or 2, wherein said corresponding identifier is derived from an embossing record.

12. A method as in claim 1 or 2, wherein au encryption module on a site controlled by said card issuer generates a secure identifier from account information.

13. A method as in claim 12, wherein said optically-readable identifier and said corresponding identifier correspond to or are derived from said secure identifier.

14. A method, as in claim 1 or 2, wherein an identifier comprises one or more of:
    a numeric code; an alpha numeric code; a text code; a non-sequential code; a one-way code; an encryption code; a hash code; meta tags; another suitable identifier.

15. A method as in claim 1 or 2, wherein said optically-readable identifier comprises one or more of:
    bar code; a digital signature; text; numerals; alpha numeric code; microdot; micro text; invisible ink; digital watermark or other suitable optically readable codes.

16. A method as in claim 1 or 2, wherein said image and said optically-readable identifier are stored in a storage facility.

17. A method as in claim 16, wherein said storage facility is on a site controlled by a card graphics hosting service.

18. A method as in claim 16, wherein said storage facility is on a site of a card finishing facility.

19. A method as in claim 16, wherein said storage facility is on a site of a card manufacturer.

20. A method as in claim 1 or 2, wherein cards with said optically-readable identifiers are transferred from the card manufacturer's control to a card finishing facility.

21. A method as in claim 1 or 2, wherein one or more of the customer-defined image and said optically-readable identifier is placed on the front of a card.

22. A method as in claim 1 or 2, wherein one or more of the customer-defined image and said optically-readable identifier is placed on the back of a card.

23. A method as in claim 1 or 2, wherein the customer has generated said customer-defined image.

24. A method as in claim 1 or 2, wherein the customer has manipulated said customer-defined image.

25. A method as in claim 1 or 2, wherein the customer has selected said customer-defined image.

26. A method as in claim 25, wherein an image is selected by a customer from an available collection of images.

27. A method, as in claim 1 or 2, wherein said customer-defined image is uploaded by a customer by means of the interact.

28. A method as in claim 1 or 2, wherein said optically-readable identifier is placed on said transaction card in a location that is subsequently covered by another feature of the card.

29. A method as in claim 28, wherein the feature is selected from one or more of:
    a chip a hologram; or a brand feature.

30. A method according to claim 1 or 2, wherein identifiers for cards authorized to be issued are received by a card graphics hosting service from an authorized card issuer such that only customer-defined images destined for cards authorized to be issued are supplied for downstream processing.

31. A method according to claim 1 or 2, wherein said customer-defined image can be manipulated in relation to a template displaying one or more non-manipulatable card features.

32. A method according to claim 1 or 2, wherein said optically-readable identifier is applied to a portion of a card which is removed to generate a finished card.

33. A method according to claim 1 or 2, wherein said optically-readable identifier is applied to a card in more than one format.

34. A method according to claim 1 or 2, wherein a finishing facility causes customer-defined images to be provided from an image gore based on reconciliation of identifiers.

35. A method as in claim 1 or 2, wherein said optically-readable identifier is embedded in said customer-defined image.

36. A method as in claim 1 or 2, wherein said optically-readable identifier and/or an identifier from which it is derived is generated by said card graphics hosting service.

37. A method as in claim 1, wherein said card issuing authority also provides said corresponding identifier associated with the customer account information.

38. A method for production of a transaction card bearing account information and a customer-defined image, the method comprising:
- receiving an identifier generated from account information of a customer;
- generating an optically readable identifier corresponding to said received identifier;
- associating said optically readable identifier with an image defined by said customer;
- receiving a corresponding identifier; and
- reconciling said corresponding identifier and said optical identifier associated with the customer-defined image to cause production of a card bearing the customer-defined image and relevant customer account information,
- wherein said customer account information is provided by a card issuing authority on a secure link to a card finishing facility, and
- wherein only said customer account information is transferred from said card issuing authority to said card finishing facility.

39. A method as in claim 38, wherein said step of associating said optically-readable identifier with an image is performed by a card graphics hosting service.

40. A method for producing a transaction card bearing account information and a customer-defined image, the method comprising:
- receiving on a secure link from a card issuing authority an identifier derived from customer account information, wherein only said customer account information is transferred from said card issuing authority to a card finishing facility on said secure link;
- embedding an optically readable version of said identifier in an image defined by said customer;
- reading said optically readable identifier and encoding a version of the identifier in a recording medium of said transaction card;
- receiving said account information at a card production facility and independently generating a corresponding identifier therefrom;
- applying relevant account information and said customer defined image to a transaction card based on reconciliation of said corresponding identifier and said encoded version of the identifier.

41. An apparatus for producing transaction cards bearing customer-defined images, comprising:
- means for receiving a card bearing a customer-defined image comprising an optically-readable identifier;
- means for receiving at least financial information relating to a corresponding identifier;
- means for reconciling said optically-readable identifier and said corresponding identifier;
- means for applying account information to a transaction card bearing said customer-defined image responsive to said reconciliation step,
- wherein said account information is provided by a card issuing authority on a secure link, and
- wherein only said account information is transferred from said card issuing authority.

42. Apparatus as in claim 41, further comprising means for deriving said corresponding identifier from said account information.

43. Apparatus as in claim 41, wherein said customer-defined image comprises an embedded optically readable identifier.

44. Apparatus as in claim 41, wherein said step of reconciling comprises reading said optical identifier and encoding a magnetically readable version of the identifier in a magnetic strip.

45. A method for producing a transaction card corresponding to an account of a customer and bearing an image defined by the customer, the method comprising:
- providing an interface for a customer to generate a customer-defined image to be applied to a transaction card;
- associating an optically-readable identifier with said customer-defined image;
- reading said optically-readable identifier and encoding a version of said identifier on a recording medium of said card;
- reconciling the encoded version of the identifier with a corresponding identifier related to customer account information to generate a transaction card bearing said customer-defined image and said customer account information,
- wherein said customer account information is provided by a card issuing authority on a secure link to a card finishing facility, and
- wherein only said customer account information is transferred from said card issuing authority to said card finishing facility.

46. A method as in claim 45, wherein said step of encoding a version of said identifier on a recording medium of the card comprises encoding a magnetic version of the identifier on the magnetic strip of a financial transaction card.

\* \* \* \* \*

UNITED STATES PATENT AND TRADEMARK OFFICE
CERTIFICATE OF CORRECTION

PATENT NO. : 8,544,731 B2
APPLICATION NO. : 10/589921
DATED : October 1, 2013
INVENTOR(S) : Elgar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1891 days.

Signed and Sealed this
Fifteenth Day of September, 2015

Michelle K. Lee
*Director of the United States Patent and Trademark Office*